(12) United States Patent
Papke et al.

(10) Patent No.: US 10,779,454 B2
(45) Date of Patent: Sep. 22, 2020

(54) SOIL PENETRATING APPARATUS WITH DEPTH CONTROL

(71) Applicant: EXMARK MANUFACTURING COMPANY, INCORPORATED, Beatrice, NE (US)

(72) Inventors: Clark S. Papke, Cortland, NE (US); Stanton L. Mapson, Lincoln, NE (US); Alex W. Buhr, Filley, NE (US); Justin L. Pryor, Beatrice, NE (US); Daniel G. Jameson, Roca, NE (US); Sang Pheng, Lincoln, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 0 days.

(21) Appl. No.: 15/883,366

(22) Filed: Jan. 30, 2018

(65) Prior Publication Data

US 2019/0230839 A1 Aug. 1, 2019

(51) Int. Cl.
*A01B 45/02* (2006.01)
*A01B 33/08* (2006.01)
*A01B 33/10* (2006.01)
*A01B 33/16* (2006.01)
*A01B 79/00* (2006.01)

(52) U.S. Cl.
CPC ............ *A01B 45/02* (2013.01); *A01B 33/082* (2013.01); *A01B 33/103* (2013.01); *A01B 33/16* (2013.01); *A01B 79/005* (2013.01)

(58) Field of Classification Search
CPC .................................................... A01B 45/02
See application file for complete search history.

(56) References Cited

U.S. PATENT DOCUMENTS 1,450,417 A   4/1923   Gingerick
2,122,286 A   6/1938   Hovde
(Continued)

FOREIGN PATENT DOCUMENTS

CA   2808761 A1   8/2014
DE   23 55 152 A1   5/1975
(Continued)

OTHER PUBLICATIONS

"AERA-vator™ Coreless Aerator" The Grasshopper Company. [retrieved on Jan. 18, 2017] Web page [online]. Retrieved from the Internet: <URL: https://www.grasshoppermower.com/implements/aera-vator-coreless-aerator/. Copyright 2017; 4 pages.
(Continued)

*Primary Examiner* — Tara Mayo-Pinnock
(74) *Attorney, Agent, or Firm* — Mueting Raasch Group

(57) ABSTRACT

A soil penetrating apparatus having an automatic tool (e.g., aerator tine) depth control system and method. The system includes an actuator that sets and controls tine depth, a sensor that monitors tine depth, and a controller that controls the actuator in response to the sensor. In some embodiments, the actuator is a hydraulic actuator, wherein once tine depth is set, flow to the actuator is bypassed. A relief may be provided to allow the tines to lift to a shallower depth temporarily when soil hardness exceeds a threshold. The system may then automatically return the tines to the preselected depth once soil conditions permit.

14 Claims, 13 Drawing Sheets

(56) References Cited

U.S. PATENT DOCUMENTS

| | | | |
|---|---|---|---|
| 2,206,264 A | 7/1940 | Rose | |
| 2,405,334 A | 8/1946 | Silver | |
| 2,406,484 A | 8/1946 | Allen | |
| 2,527,840 A | 10/1950 | Mott | |
| 2,621,575 A | 12/1952 | Berg | |
| 2,641,172 A | 6/1953 | Silver | |
| 2,670,668 A | 3/1954 | Konig | |
| 2,754,647 A | 7/1956 | Bennett et al. | |
| 2,755,721 A | 7/1956 | Rusconi | |
| 2,960,172 A | 11/1960 | Henson | |
| 2,964,115 A | 12/1960 | Clatfelter | |
| 3,042,121 A | 7/1962 | Broetzman et al. | |
| 3,233,680 A | 2/1966 | Arzoian et al. | |
| 3,235,010 A | 2/1966 | North | |
| 3,245,477 A | 4/1966 | Wilcox | |
| 3,396,803 A | 8/1968 | Corni | |
| 3,400,764 A | 9/1968 | Schneider | |
| 3,477,519 A | 11/1969 | Converse | |
| 3,494,427 A | 2/1970 | Greig et al. | |
| 3,700,043 A | 10/1972 | Sullivan et al. | |
| 3,724,108 A | 4/1973 | Clayton | |
| 3,739,856 A | 6/1973 | Ray | |
| 3,777,460 A | 12/1973 | Mokros | |
| 3,794,121 A | 2/1974 | Drozak | |
| 3,802,513 A | 4/1974 | Ploenges | |
| 3,878,901 A | 4/1975 | Robertson, Sr. | |
| 3,917,002 A | 11/1975 | Mueller, Jr. | |
| 3,977,476 A | 8/1976 | Van der Lely | |
| 4,031,963 A | 6/1977 | Poggemiller et al. | |
| 4,069,774 A * | 1/1978 | Lofgren | A01C 5/04 |
| | | | 111/117 |
| 4,096,915 A | 6/1978 | Groth | |
| 4,107,859 A | 8/1978 | Keith | |
| 4,154,305 A | 5/1979 | Prewett | |
| 4,186,806 A | 2/1980 | Ward | |
| 4,273,056 A * | 6/1981 | Lofgren | A01C 5/04 |
| | | | 111/115 |
| 4,306,732 A | 12/1981 | Pettibone | |
| 4,355,688 A | 10/1982 | Hamm et al. | |
| 4,423,788 A | 1/1984 | Robinson, Jr. et al. | |
| 4,550,783 A | 11/1985 | Hansen | |
| 4,566,543 A * | 1/1986 | Kotani | A01B 35/00 |
| | | | 111/118 |
| 4,579,038 A | 4/1986 | Winter | |
| 4,600,060 A | 6/1986 | Winter et al. | |
| 4,606,412 A * | 8/1986 | Classen | A01B 45/023 |
| | | | 172/22 |
| 4,622,884 A | 11/1986 | Buchl | |
| 4,646,620 A | 3/1987 | Buchl | |
| 4,658,909 A | 4/1987 | McDermott et al. | |
| 4,660,649 A | 4/1987 | Anderson et al. | |
| 4,662,456 A | 5/1987 | Classen | |
| 4,700,784 A | 10/1987 | Wiebe et al. | |
| 4,750,440 A | 6/1988 | Pollard et al. | |
| 4,762,183 A | 8/1988 | Bourgault et al. | |
| 4,773,486 A | 9/1988 | Huber et al. | |
| 4,775,013 A | 10/1988 | van der Lely | |
| 4,775,940 A | 10/1988 | Nishida et al. | |
| 4,819,737 A | 4/1989 | Frase | |
| 4,825,655 A | 5/1989 | Buchl et al. | |
| 4,865,132 A | 9/1989 | Moore, Jr. | |
| 5,014,791 A | 5/1991 | Kure | |
| 5,119,880 A | 6/1992 | Zehrung, Jr. et al. | |
| 5,152,348 A | 10/1992 | Flanagan, Sr. et al. | |
| 5,398,769 A | 3/1995 | Staples | |
| 5,452,768 A | 9/1995 | Koberlein | |
| 5,509,487 A | 4/1996 | Dufty et al. | |
| 5,579,850 A | 12/1996 | Kimura et al. | |
| 5,662,172 A | 9/1997 | Brown | |
| 5,690,179 A | 11/1997 | Dickson | |
| 5,765,645 A | 6/1998 | Postema | |
| 5,988,293 A | 11/1999 | Brueggen et al. | |
| 5,988,948 A | 11/1999 | Featherstone | |
| 6,085,846 A | 7/2000 | Buchl et al. | |
| 6,102,129 A | 8/2000 | Classen | |
| 6,164,385 A | 12/2000 | Buchl | |
| 6,216,794 B1 | 4/2001 | Buchl | |
| 6,216,795 B1 | 4/2001 | Buchl | |
| 6,389,999 B1 | 5/2002 | Duello | |
| 6,497,294 B2 | 12/2002 | Vought | |
| 6,634,626 B2 | 10/2003 | Petrescu et al. | |
| 6,651,415 B2 | 11/2003 | Burke | |
| 6,684,960 B1 | 2/2004 | Ng et al. | |
| 6,701,857 B1 | 3/2004 | Jensen et al. | |
| 6,708,773 B1 | 3/2004 | Kinkead et al. | |
| 6,786,130 B2 | 9/2004 | Steinlage et al. | |
| 6,832,657 B1 | 12/2004 | LaFlair | |
| 7,028,554 B2 | 4/2006 | Adamchuk et al. | |
| 7,163,068 B2 | 1/2007 | Job | |
| 7,198,114 B2 | 4/2007 | Simon et al. | |
| 7,293,612 B1 | 11/2007 | Peterson et al. | |
| 7,360,495 B1 | 4/2008 | Martin | |
| 7,669,667 B2 | 3/2010 | Petersen et al. | |
| 8,162,071 B2 | 4/2012 | Barger | |
| 8,235,130 B2 | 8/2012 | Henry et al. | |
| 8,291,843 B2 | 10/2012 | Wealleans | |
| 8,327,947 B2 | 12/2012 | Martindale et al. | |
| 8,424,613 B2 | 4/2013 | Hurley | |
| 8,459,371 B2 | 6/2013 | Hoffman | |
| 8,573,319 B1 | 11/2013 | Casper et al. | |
| 8,733,477 B1 | 5/2014 | Cook | |
| 8,844,645 B2 | 9/2014 | Hall et al. | |
| 8,857,530 B2 | 10/2014 | Henry | |
| 8,875,421 B2 | 11/2014 | Paull | |
| 8,925,643 B2 | 1/2015 | Georgoulias et al. | |
| 8,935,986 B2 | 1/2015 | Blomme et al. | |
| 8,944,175 B2 | 2/2015 | Barger | |
| 8,955,610 B1 * | 2/2015 | Longmeyer | A01B 45/023 |
| | | | 172/21 |
| 8,985,232 B2 | 3/2015 | Bassett | |
| 9,148,988 B2 | 10/2015 | Baker | |
| 9,241,437 B2 | 1/2016 | Bryant et al. | |
| 9,301,439 B2 | 4/2016 | Gilstring | |
| 9,307,688 B2 | 4/2016 | Adams et al. | |
| 9,307,689 B2 | 4/2016 | Adams et al. | |
| 9,462,738 B2 | 10/2016 | Bryant et al. | |
| 9,474,196 B2 | 10/2016 | Kinkead et al. | |
| 9,510,497 B2 | 12/2016 | Zabel et al. | |
| 9,516,796 B2 | 12/2016 | Sudbrink et al. | |
| 9,591,796 B2 | 3/2017 | Bryant et al. | |
| 2005/0006110 A1 * | 1/2005 | Wessel | A01B 45/023 |
| | | | 172/22 |
| 2005/0023009 A1 * | 2/2005 | Banks | A01B 45/023 |
| | | | 172/21 |
| 2005/0044656 A1 | 3/2005 | Prevost | |
| 2005/0165521 A1 | 7/2005 | Gruhn | |
| 2005/0178567 A1 | 8/2005 | Wiedenmann | |
| 2006/0260523 A1 | 11/2006 | Claydon | |
| 2008/0110649 A1 | 5/2008 | Connell et al. | |
| 2010/0314142 A1 | 12/2010 | Keane et al. | |
| 2010/0319941 A1 | 12/2010 | Peterson | |
| 2011/0005783 A1 | 1/2011 | Livingstone | |
| 2011/0220373 A1 | 9/2011 | Martindale | |
| 2015/0216102 A1 * | 8/2015 | Georgoulias | A01B 45/023 |
| | | | 172/22 |
| 2015/0257329 A1 | 9/2015 | Modzik et al. | |
| 2016/0021812 A1 | 1/2016 | Modzik et al. | |
| 2016/0157413 A1 | 6/2016 | Kowalchuk et al. | |
| 2017/0034996 A1 | 2/2017 | Kruckeberg et al. | |
| 2018/0103571 A1 | 4/2018 | Kinkead et al. | |

FOREIGN PATENT DOCUMENTS

| | | |
|---|---|---|
| DE | 41 21 218 A1 | 3/1992 |
| EP | 1 340 418 B1 | 4/2008 |
| EP | 1 974 595 A1 | 10/2008 |
| EP | 2 462 794 A1 | 6/2012 |
| EP | 2 371 193 B1 | 11/2012 |
| FR | 3 002 721 B1 | 8/2015 |
| GB | 399638 | 10/1933 |
| GB | 518946 | 3/1940 |
| GB | 2 187 372 A | 9/1987 |
| GB | 2 186 172 B | 1/1990 |

(56) References Cited

FOREIGN PATENT DOCUMENTS

| GB | 2 306 287 B | 3/1999 |
|---|---|---|
| JP | 61-149001 A | 7/1986 |
| KR | 10-2011-0046338 A | 5/2011 |
| SU | 1094587 A | 5/1984 |
| WO | WO 02/074058 A1 | 9/2002 |
| WO | WO 02/094000 A1 | 11/2002 |
| WO | WO 2007/056819 A1 | 5/2007 |
| WO | WO 2010/026379 A2 | 3/2010 |
| WO | WO 2010/120166 A1 | 10/2010 |

OTHER PUBLICATIONS

"Aerator Safety & Operation Tips" Quality Equipment Rentals. [retrieved on Jan. 18, 2017] Web page [online]. Retrieved from the Internet: <URL: http://www.qrentals.com/aerator.php>. Copyright 2015; 2 pages.

"Spring tine meadow aerator / depth control / folding RENOVA Series JOSKIN S.A." Info Sheet. AgriEXPO. [retrieved on Jan. 17, 2017] Web page [online]. Retrieved from the Internet: <URL: http://www.agriexpo.online/prod/joskin-sa/product-169425-3470.html>. Copyright 2017; 18 pages.

Deere, "Aerator Model OMTCU28130" Product Manual. Deere & Company, [retrieved on Jan. 18, 2017] Web page [online]. Retrieved from the Internet: <URL: http://manuals.deere.com/cceomview/OMTCU28130_C2/Output/OMTCU28130_C29.html>. Copyright 2017; 14 pages.

Exmark "Stand-On Aerator" Operator's Manual. For Serial Nos. 400,000,000 & Higher, Part No. 4503-213 Rev. B, Exmark Manufacturing Company, Inc., Beatrice, Nebraska, Copyright 2017; 48 pages.

"Focus On: Aerators" Grounds Maintenance, [retrieved on Jan. 18, 2017] Web page [online]. Retrieved from the Internet: <URL: http://www.grounds-mag.com/mag/grounds_maintenance_focus_aerators/>. Pub. date Unknown; 6 pages.

"When it comes to turf aeration, professionals define quality by quantity, depth and pattern" Landscape Management, North Coast Media LLC. Content Sponsored by Classen Pro. [retrieved on Jan. 18, 2017] Web page [online]. Retrieved from the Internet: <URL: http://landscapemanagement.net/sponsoredcontent/quality-of-core-aeration/>. Copyright 2017; 6 pages.

Lawnaire® ZTS. Ryan Turf, Schiller Grounds Care, Inc. Web page [online] [retrieved on Jan. 17, 2017]. Retrieved from the Internet: <URL: http://ryanturf.com/products/aerators-stand-on/lawnaire-zts/>. Copyright 2006-2017, 3 pages.

Lawnaire® ZTS, Specifications Sheet. Ryan Turf, Schiller Grounds Care, Inc., Copyright 2016; 1 page.

Toro "ProCore® 864 and 1298 Aerator, Model No. 09715—Serial No. 315000001 and Up and Model No. 09716—Serial No. 315000001 and Up" Operator's Manual. Form No. 3391-786 Rev A, The Toro Company, Copyright 2014; 32 pages.

Toro InfoClick™, "ProCore® 864 and 1298 Aerators: Operation: Adjusting Aeration Depth" The Toro Company, [retrieved on Jan. 18, 2017] Web page [online]. Retrieved from the Internet: <URL: https://icontent.toro.com/smartmanuals/ProCore1298/Proc20778.htm>. Pub. Date Unknown; 3 pages.

"S18-37ADQ-5KCP4—Quadrature (2 Channel) Gear Tooth Sensor" Datasheet. Sensor Solutions, Available at least as early as Jun. 14, 2017; 2 pages.

\* cited by examiner

SOIL PENETRATING APPARATUS WITH DEPTH CONTROL

Embodiments of the present disclosure relate to soil penetrating apparatus (e.g., turf aerators) and, more particularly, to systems and methods for controlling soil penetration depth of a tool (e.g., aerator tines).

BACKGROUND

Soil penetrating machines are well-known for promoting turf health. For example, turf aerators are used to create perforations in a soil surface. Such perforations allow water, air, and nutrients to more effectively reach grass roots. Aeration may be especially beneficial in areas where high soil compaction is common.

While various methods of forming soil perforations are known, one common method involves the use of a set of penetrating coring tines that are driven into the soil surface during operation. Some aerators utilize tubular coring tines that, when withdrawn, extracts a "plug" of soil, leaving a perforation in its place. The soil core may be ejected onto the turf, where it eventually breaks down. Other aerators may utilize solid tines.

To set tine penetration depth, an aerator operator typically sets a physical down stop and/or a maximum downward force applied to a coring head supporting the tines, wherein the down stop/force is selected to produce the desired tine depth penetration based upon turf/soil conditions. While effective, soil hardness may vary not only from site-to-site, but also across different turf areas of the same property. As a result, inconsistent penetration depth may result as the aerator moves from a turf area having a first soil hardness to an area having a second soil hardness. For example, setting the coring head downward force to an appropriate value for a first turf area may result in a coring depth that is too shallow, or too deep, for an adjacent turf area.

SUMMARY

Embodiments described herein may provide soil penetrating systems and methods that address these and other issues by providing, in one embodiment, a soil penetrating apparatus having: a chassis; and a tool head assembly operatively attached to the chassis, wherein the tool head assembly is movable relative to a soil surface between an elevated position and any one of a plurality of soil penetrating positions. A control input is provided and adapted to select a desired soil penetration depth corresponding to one of the plurality of soil penetrating positions of the tool head assembly. An actuator may move the tool head assembly between the elevated position and any one of the plurality of soil penetrating positions, and a controller may command the actuator to a position corresponding to the desired soil penetration depth. A sensor provides a feedback signal to the controller corresponding to the position of the tool head assembly.

In another embodiment, a turf aerator is provided that includes: a chassis; and a coring head assembly operatively attached to the chassis and movable between an elevated position and any one of a plurality of aerating positions. A control input adapted to select a desired soil penetration depth corresponding to one of the plurality of aerating positions of the coring head assembly is also included, as is a linear hydraulic actuator adapted to move the coring head assembly between the elevated position and any one of the plurality of aerating positions. A controller is included and adapted to command the actuator to a position corresponding to the desired soil penetration depth, and a sensor is adapted to provide a feedback signal to the controller corresponding to the position of the coring head assembly. A valve is also included and adapted to: deliver hydraulic flow to the hydraulic actuator while the coring head assembly moves from the elevated position to the desired soil penetration depth; and bypass, with the hydraulic flow, the hydraulic actuator while the coring head assembly is at the desired soil penetration depth.

In yet another embodiment, a turf aerator is provided. The aerator includes: a chassis supported upon a soil surface by left and right drive members; and a coring head assembly operatively attached to the chassis and adapted to rotate about a coring head axis transverse to a longitudinal axis of the aerator, the coring head assembly movable between an elevated position and any one of a plurality of aerating positions. A prime mover attached to the chassis is provided and adapted to power the coring head assembly and one or more of the drive members, while a depth control system is adapted to maintain a desired soil penetration depth of the coring head assembly as the coring head assembly moves over turf areas of different soil hardness. The control system includes: a control input adapted to set a desired soil penetration depth corresponding to one of the plurality of aerating positions of the coring head assembly; a sensor operable to estimate a position of the coring head assembly; a relief adapted to permit a reduction of soil penetration depth to a depth less than the desired soil penetration depth when the coring head assembly encounters a soil hardness exceeding a predetermined hardness threshold; an actuator adapted to return the coring head assembly to the desired soil penetration depth when the soil hardness is again at or below the predetermined hardness threshold; and a controller adapted to energize the actuator to move the coring head assembly to the desired soil penetration depth.

In still another embodiment, an actuator assembly is provided that includes a linear actuator having a cylinder and a rod adapted to extend and retract from the cylinder. The assembly further includes: a rail support positioned proximate the cylinder; and a sensor rail supported by the rail support and attached to the rod. The sensor rail translates relative to the rail support as the sensor rail moves with the rod. The sensor rail further defines a series of edges. A quadrature encoder is included and attached to the rail support, wherein the encoder detects the passage of edges of the series of edges as the rod extends and retracts from the cylinder.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
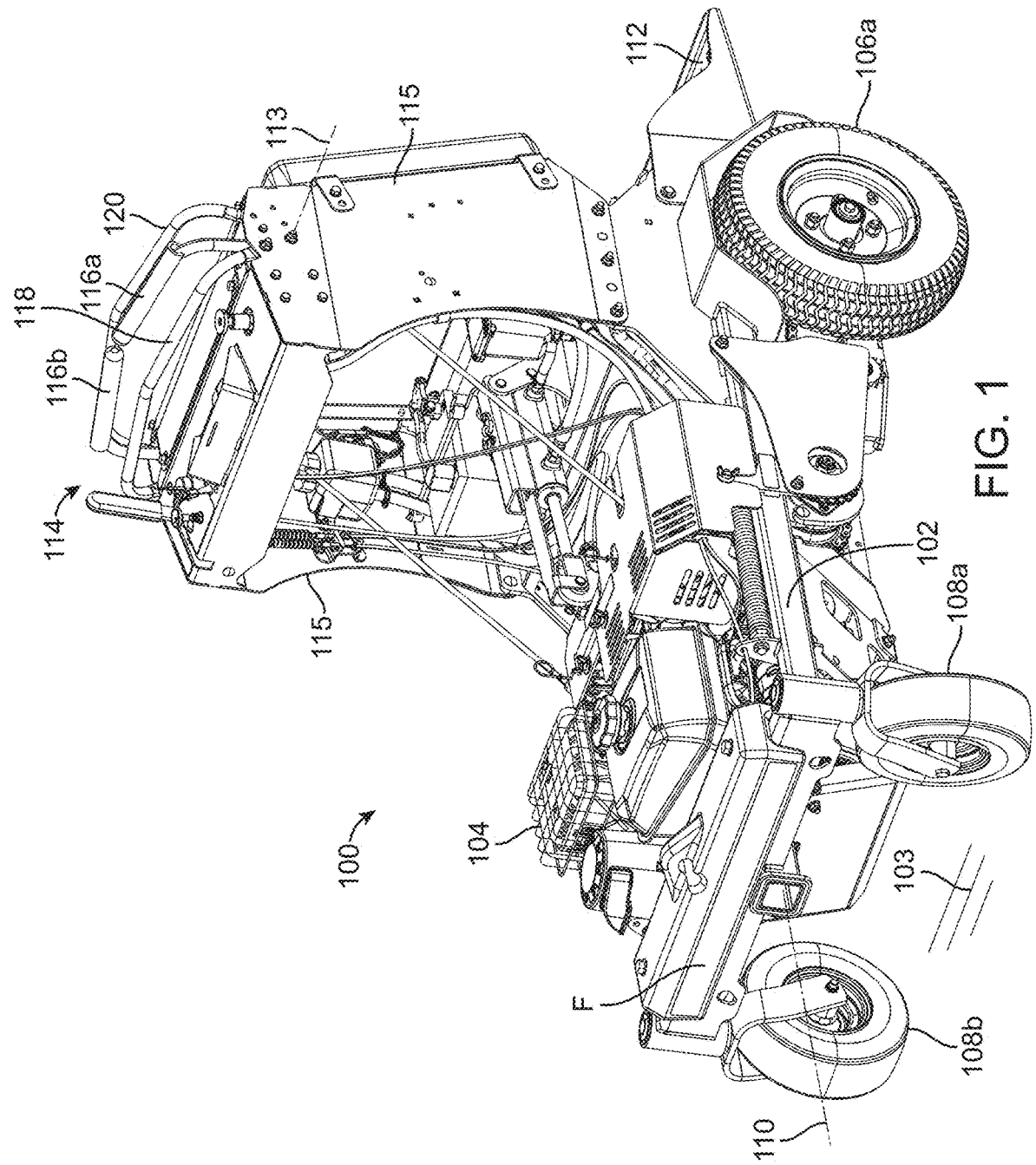
FIG. 1 is front perspective view of a soil penetrating apparatus (e.g., turf aerator) in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the description and claims are to be understood as being modified in all instances by the term "about."

Embodiments of the present disclosure are directed to soil penetrating apparatus having a tool head assembly and a tool head depth control system. The depth control system may seek to automatically maintain a constant soil penetration depth of the tool head assembly as the apparatus travels over areas of varying soil hardness. For example, in some embodiments of the present disclosure, a turf aerator is provided that includes: a chassis; a coring head assembly operatively attached to the chassis and movable between an elevated position and any one of a plurality of aerating positions. A control input may also be provided and adapted to allow the operator to select a desired soil penetration depth corresponding to one of the plurality of aerating positions of the coring head assembly. An actuator (e.g., linear hydraulic actuator, electric actuator, rotary actuator) may be provided and adapted to move the coring head assembly between the elevated position and any one of the plurality of aerating positions. A controller then commands the actuator to a position corresponding to the desired soil penetration depth. A sensor provides a feedback signal to the controller corresponding to the position of the coring head assembly. In some embodiments, a relief (e.g., relief valve) may be provided to permit the actuator to move toward the elevated position should the tines encounter an area having a soil hardness in excess of a predetermined hardness threshold. When this occurs, the controller, via feedback from the sensor, seeks to automatically return the coring head assembly to the desired soil penetration depth. Embodiments of the present disclosure may also include a real-time indicator, e.g., display, informing the aerator operator of the approximate penetration depth being achieved. As used herein, the term "soil" refers to the upper layer of ground in which plants and grass may form roots and grow. Accordingly, soil may include, without limitation, dirt, sand, clay, silt, etc.

With reference to the figures of the drawing, wherein like reference numerals designate like parts and assemblies throughout the several views, FIG. 1 illustrates a vehicle including a soil penetrating apparatus, e.g., turf aerator 100. The aerator 100 may incorporate a depth control system in accordance with embodiments of the present disclosure. As shown in this view, the aerator 100 may be configured as a dedicated, self-propelled, ride-on (e.g., stand-on) and/or walk-behind vehicle. While, described with reference to such dedicated aerators (also referred to herein simply as "vehicle"), those of skill in the art will realize that the concepts described herein are equally applicable to other types of aerators (e.g., those configured as removable attachments to multi-purpose tractors/vehicles) as well as to almost any other walk-behind, ride-behind, or ride-on self-propelled, grounds maintenance apparatus incorporating a tool or implement wherein precise soil penetration depth control of the tool or implement is desired. Such vehicles may include, for example, plows, tillers, slicer-seeders, and de-thatchers.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the aerator 100 while the aerator is in an operating configuration, e.g., while the aerator 100 is positioned such that wheels 106 and 108 rest upon a generally horizontal ground or soil surface 103 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

Figure 2:
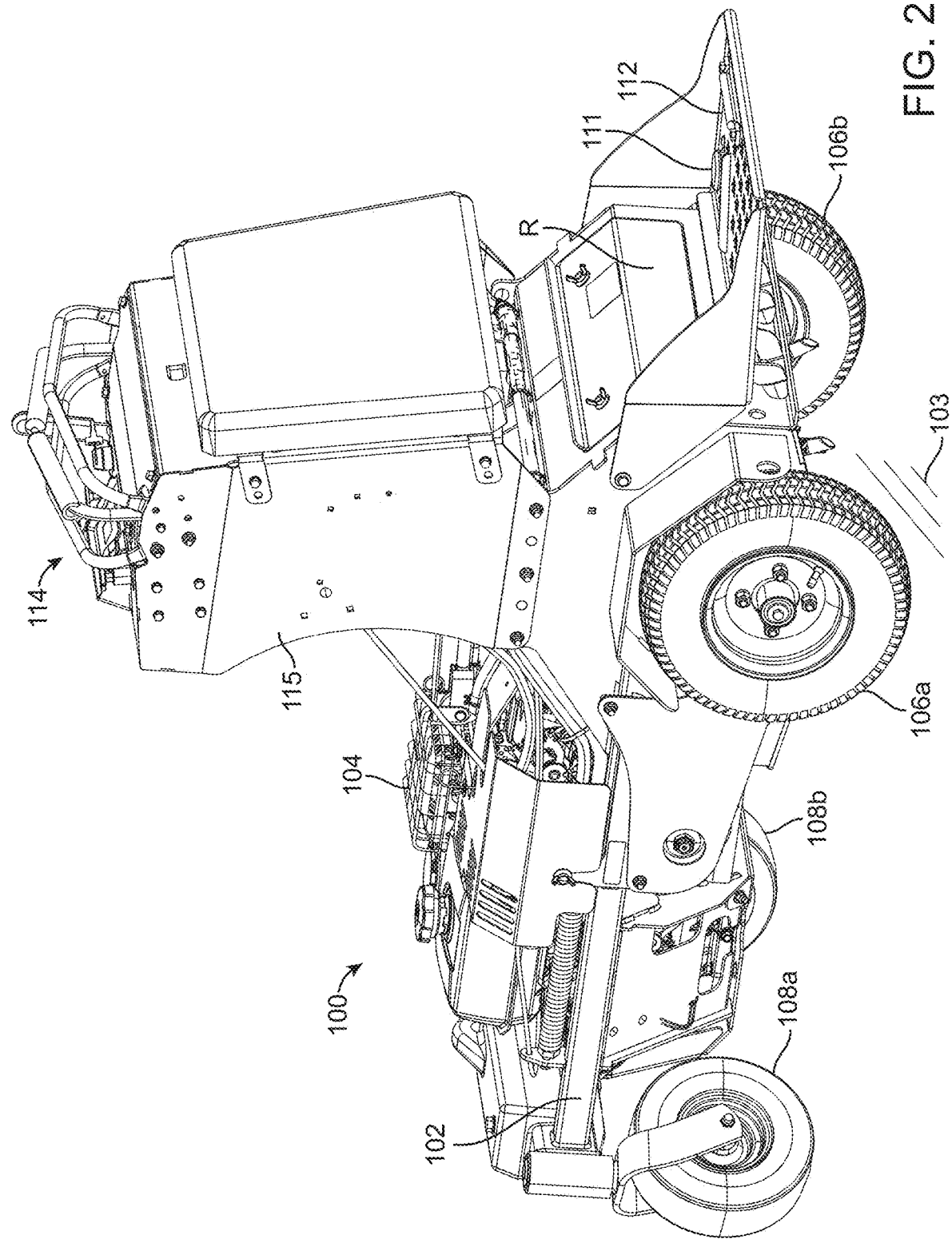
FIG. 2 is a rear perspective view the turf aerator of FIG. 1.

An exemplary aerator 100 is shown in FIGS. 1 and 2. The aerator 100 may include a chassis or frame 102 with a front end F and a rear end R. A longitudinal axis 110 extends between the front and rear ends (e.g., the axis 110 being parallel to a direction of aerator travel when the aerator is traveling in a straight line). The chassis 102 may support a power source or prime mover, e.g., electric motor or internal combustion engine 104. A pair of transversely opposing, ground engaging drive members, e.g., first and second (left and right) rear drive wheels 106a and 106b, may be coupled to opposite (left and right) rear sides of the chassis to support the aerator upon, and propel the aerator over, the soil surface 103. Each drive wheel 106 may be powered by its own unitized transaxle 105 (left and right transaxles 105a, 105b shown in FIG. 3), each including its own hydrostatic pump, motor, and associated gearing. The transaxles 105 may be supported by the chassis 102 and powered by the engine 104 (e.g., via a drive belt pulley 154 (see FIG. 6) as further described below). While not illustrated, other drive systems, e.g., gear, chain, or pulley driven systems, pumps and wheel motors, etc. may also be utilized without departing from the scope of the disclosure. Moreover, ground engaging members other than wheels (e.g., tracks) are also contemplated.

A pair of front ground engaging wheels (e.g., left and right caster wheels 108a, 108b) may attach to forwardly extending rails of the chassis 102 and support the front of the aerator 100 in rolling engagement with the soil surface 103. Although the illustrated aerator 100 has the drive wheels 106 in the rear and caster wheels 108 in front, this configuration is not limiting. For example, other embodiments may reverse the location of the wheels, e.g., drive wheels in front and driven or undriven wheels in back, 4-wheel steer, and 4-wheel drive. Moreover, other configurations may use different wheel configurations altogether, e.g., a tri-wheel configuration or a vehicle having conventionally-steered wheels.

Figure 3:
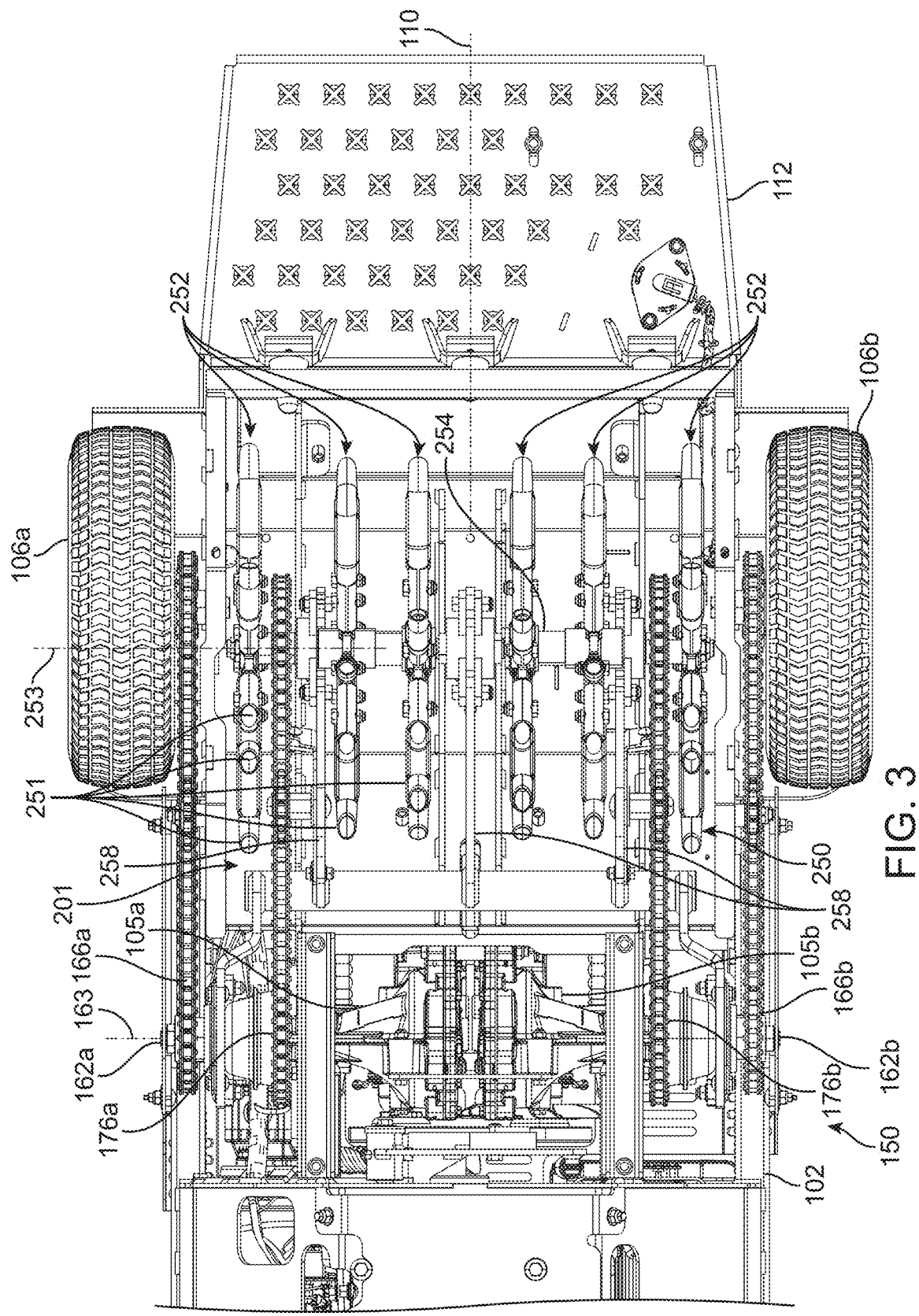
FIG. 3 is a partial bottom plan view of the aerator of FIG. 1.
Figure 4:
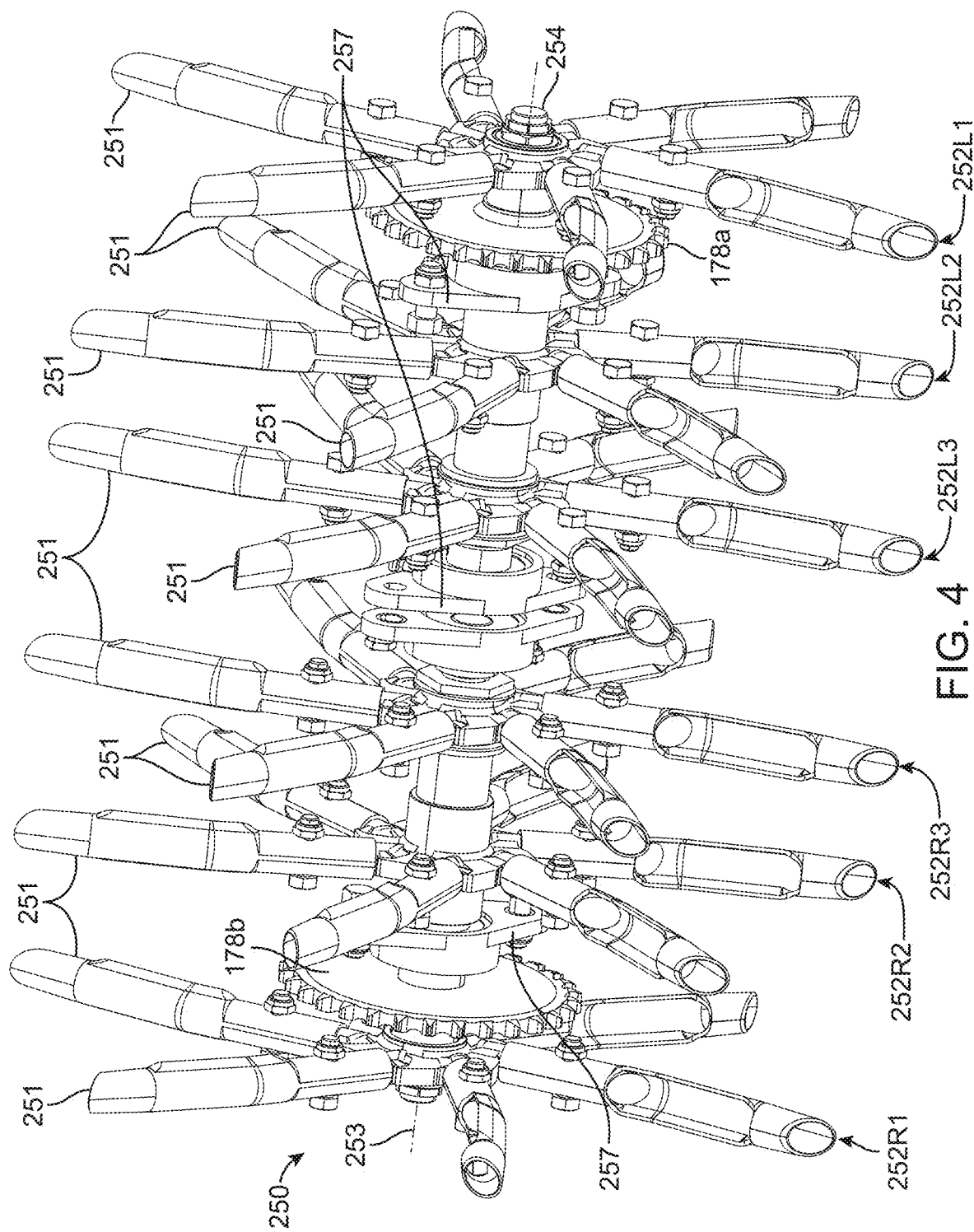
FIG. 4 is a perspective view of a tool head, e.g., coring head and its accompanying tines, in accordance with embodiments of this disclosure.

A tool or implement, e.g., coring head 250, may be connected to a lower side of the chassis 102 (generally longitudinally between the drive wheels 106 and the caster wheels 108) as shown in FIGS. 3 and 4. The coring head 250 may form part of a tool or coring head assembly 201 as further described below. While shown as being attached to the chassis between the front and rear wheels, such a configuration is exemplary only as embodiments having the coring head assembly 201 positioned elsewhere (e.g., in front of the front wheels, behind the rear wheels) are also possible.

Figure 9:
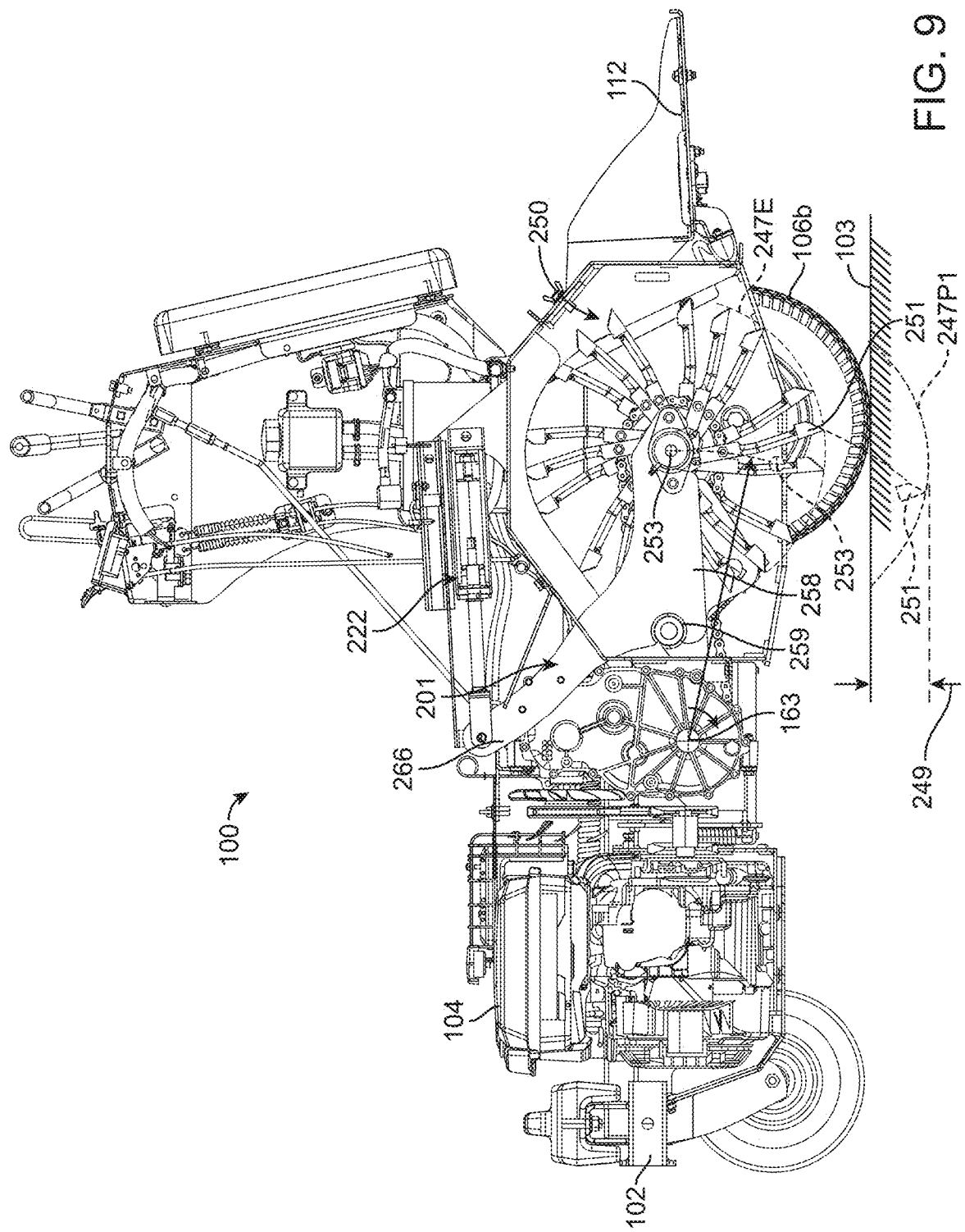
FIG. 9 is section view of the aerator of FIG. 1 illustrating aspects of an exemplary coring head depth control system.

The exemplary coring head 250 may include a plurality of tubular coring spikes or tines 251 adapted to perforate the soil surface 103. The coring head 250 and the drive wheels 106 are operatively powered by a drive system 150. The coring head 250 may be lowered from an elevated or transport position shown in solid lines in FIG. 9 (note that an outer surface of revolution defined by the coring head, when in the elevated position, is indicated by arc segment 247E) to any one of several aerating or soil penetrating positions. One such soil penetrating position is indicated in FIG. 9 by the sub-surface broken line representation of tine 251 and the arc segment 247P1 (the arc segment 247P1 indicating the now-relocated surface of revolution of the coring head/tines). When in any one of the soil penetrating positions, the coring head 250/tines 251 of the coring head assembly 201 may penetrate the soil to a pre-selected depth corresponding to a selected (desired) soil penetration depth 249. When power is then delivered to the coring head 250, the head, and thus the coring tines 251, rotate about a coring head axis 253 (the axis 253 being transverse to the longitudinal axis 110 of the aerator) as the coring head passes over the soil surface 103. While described herein as having a coring head that rotates, other embodiments of the present disclosure may utilize a tool (e.g., coring head) that reciprocates.

The exemplary coring head 250 may have a number of coring spiders or "disks" 252, wherein each disk includes a central hub and a plurality of the radially protruding coring tines 251. While not wishing to be bound to any specific embodiment, the illustrated coring head 250 may provide a coring width of 24 inches and include three left disks 252L1, 252L2, and 252L3, as well as three right disks 252R1, 252R2, and 252R3 (see FIG. 4). Each disk 252 may include six replaceable tubular coring tines 251. As further described below, the left two disks (251L1 and 252L2) may be powered during operation to rotate (about the axis 253) at a speed similar to that of the left drive wheel 106a, while the right two disks (251R1 and 252R2) may be powered to rotate during operation at a speed similar to that of the right drive wheel 106b. The two center disks (252L3 and 252R3) may be driven or, alternatively, may freewheel as shown in the illustrated embodiment. The coring head may include a hex shaft 254 supported, relative to the chassis 102 of the aerator, by shaft supports 257. The coring disks 252 may then be supported for rotation on the hex shaft 254 (powered rotation in the case of the outermost four disks, and freewheeling in the case of the innermost two disks).

The exemplary aerator 100 may further include a platform 112 attached to the chassis 102 at or near the rear end R (see FIG. 2). The platform may be fixed as shown to support an operator standing upon the platform 112. Alternatively, the platform could be moved between a deployed position as shown in FIG. 2, and a stowed position (not shown), the latter accommodating walk-behind operation.

Figure 5:
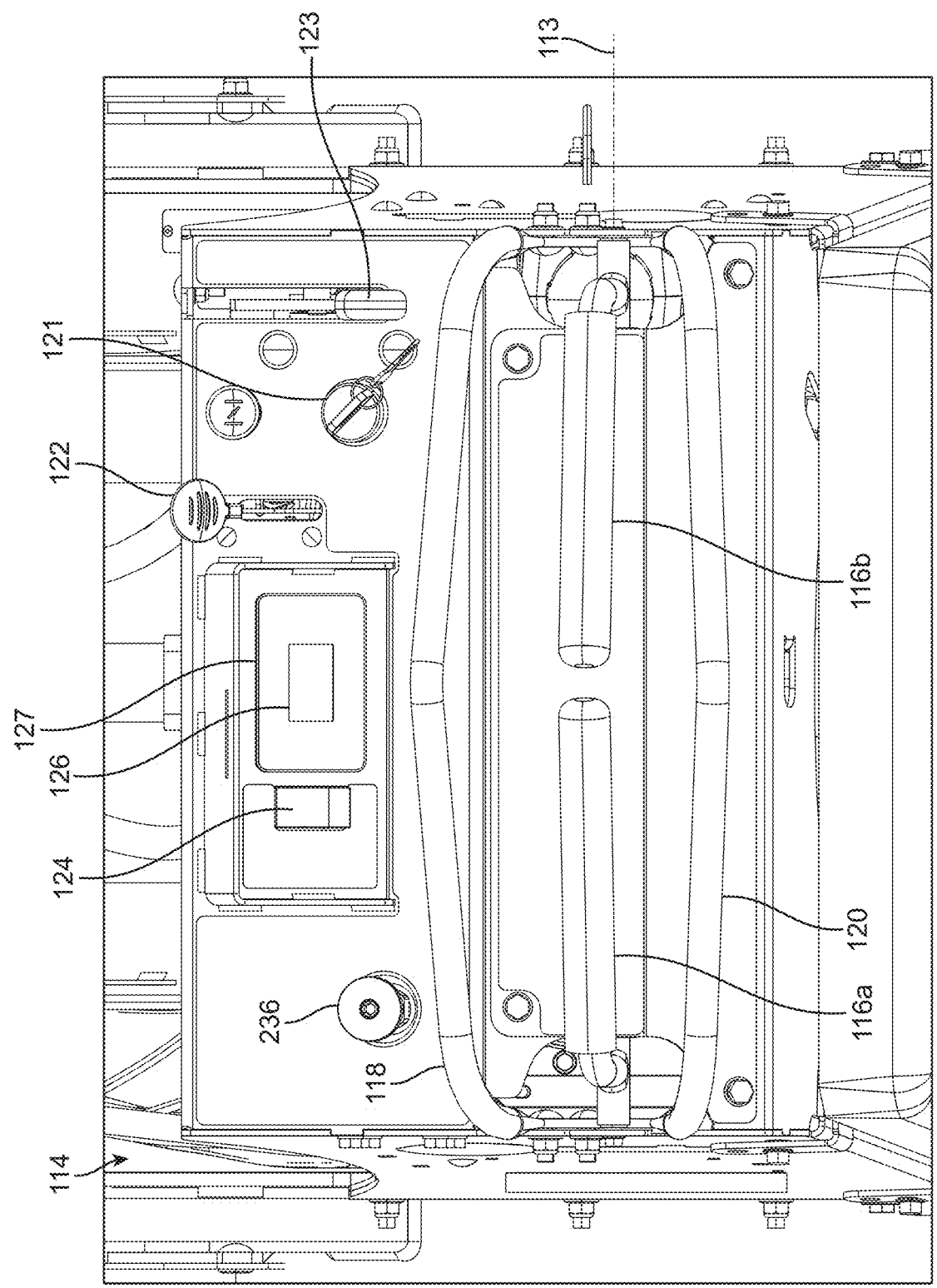
FIG. 5 is a top plan view of an exemplary control area of the aerator of FIG. 1.

As illustrated in FIGS. 1-2 and 5, the aerator 100 may further include a control area 114 at or near the rear end R of the chassis 102. The control area 114 may be located at or near a top of an upwardly extending portion of the chassis 102 referred to herein as the control tower 115.

The control area 114 provides various operator controls positioned within comfortable reach of an operator standing upon the platform 112. For example, the control area 114 may include a first (e.g., left) control lever 116a and a second (e.g., right) control lever 116b both pivotally attached to the aerator 100, e.g., to the control tower 115. The control levers 116 may be configured to pivot about a generally transverse axis 113 (i.e., an axis transverse to the longitudinal axis 110 of the aerator 100) between a first or forward stop 118, and a second or rearward stop 120. Once the levers are released, they may return to a neutral position, effectively stopping the aerator 100.

The control levers 116 may be biased to an intermediate, neutral position between the two stops 118 and 120 as shown in FIGS. 1, 2 and 5. Movement of either of the control levers 116 (e.g., lever 116a) forwardly (e.g., towards the forward stop 118) may result in a proportional increase in forward speed of the respective drive wheel 106 (e.g., wheel 106a) via the drive system 150 as described below. Similarly, movement of either of the control levers rearwardly (e.g., towards the rearward stop 120) may result in a proportional increase in rearward speed of the respective drive wheel 106. The neutral position of the control levers 116 may be located more closely to the rearward stop 120 to provide a greater range of movement of the levers for forward speed control. Each control lever 116 may thus independently vary a velocity of its respective drive wheel 106 incrementally between zero forward velocity and maximum forward velocity without varying the engine throttle. Each lever 116 may additionally be movable to a third position (abutting the stop 120) corresponding to a maximum reverse velocity of its respective drive wheel 106.

As FIG. 5 illustrates, the control area 114 may additionally include other controls, e.g., a key ignition 121, a parking brake selector lever 123, and engine throttle 122. Moreover, various controls for the aeration process, e.g., a coring head depth adjustment control 124, relief adjuster 236, and an electronic depth controller 127 (which may include a multifunction display 126) may also be included and are further described below.

Figure 6:
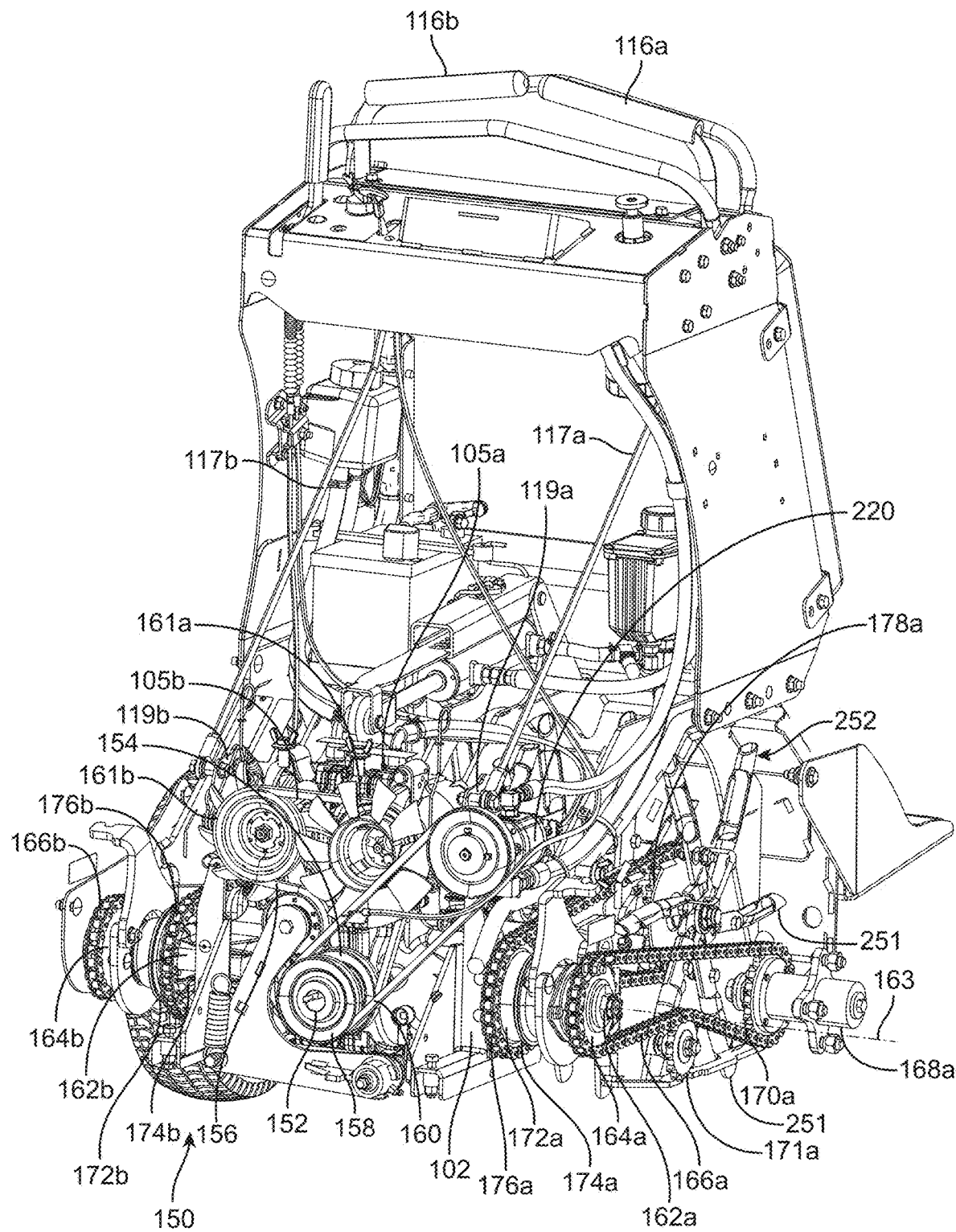
FIG. 6 is a partial perspective view of a propulsion and coring head drive system in accordance with embodiments of the present disclosure.

FIG. 6 illustrates the exemplary propulsion and coring head drive system 150 in more detail (note that various portions of the aerator, including the engine 104, are removed from this view to better illustrate aspects of the drive system). The drive system 150 includes an input 152 connected, directly or indirectly, to a drive shaft (not shown) of the engine 104. The input 152 has attached thereto a first drive belt pulley 154 providing power to an endless first drive belt 156, and a second drive belt pulley 158 providing driving power to an endless second drive belt 160.

The first drive belt 156 is engaged with pulleys 161a and 161b of left and right transaxles 105a and 105b, respectively (see also FIG. 3), which are each secured to the chassis 102. Each transaxle 105 further includes an output shaft 162 (162a, 162b) rotatable about a shaft axis 163 and having connected thereto a drive wheel sprocket 164 (164a, 164b) driving a drive wheel chain 166 (166a, 166b). Each drive wheel chain 166 is, in turn, connected to a drive wheel hub 168 via a hub sprocket 170 (only left hub and sprocket are visible in FIG. 6, but right side is generally a mirror image). Accordingly, during operation, rotation of the output shaft 162 results in corresponding rotation of the associated wheel hub 168. Each chain 166 may also include a tension adjuster 171 to set and maintain tension in the chain.

Each output shaft 162 may further include a driven sleeve 172 (172a, 172b) having attached thereto a coring head drive sprocket 174 (174a, 174b) adapted to drive an associated tool chain 176 (176a, 176b). Each tool chain 176 is, in turn, connected to a tine sprocket 178 (178a, 178b) on its respective side of the coring head 250 (see also FIG. 3). As a result, during operation, rotation of the output shaft 162 results in corresponding rotation of the associated side (i.e., left or right) of the coring head (see also FIG. 3) as well as rotation of the corresponding drive wheel 106. As stated above, only some of the tine disks 252 (see FIG. 3) on each side of the coring head 250 (i.e., the two outermost tine disks 252 on each side of the head) may be driven via the associated tine sprocket 178. The innermost disk 252 on each of the left and right sides of the coring head may, as stated above, freewheel.

Figure 7:
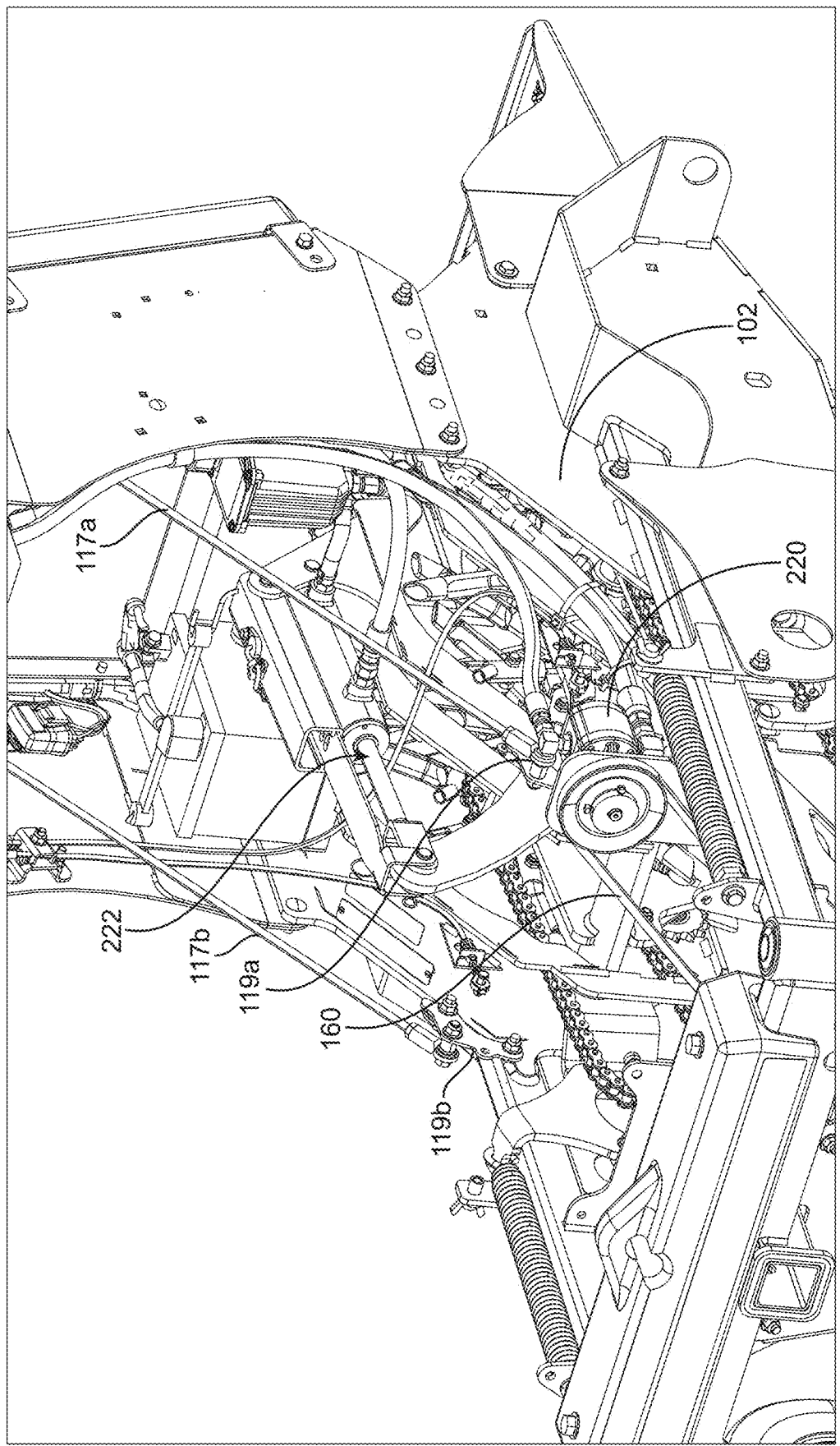
FIG. 7 is a partial perspective view of the aerator of FIG. 1 illustrating aspects of a coring head depth control system in accordance with embodiments of the present disclosure.

While the first drive belt 156 provides power to drive the coring head and drive wheels, the second drive belt 160 may deliver power from the input 152 to a hydraulic pump 220 supported by the chassis 102 as also shown in FIG. 7 (transaxles 105 removed in this view). The pump 220, as further described below, may provide pressurized hydraulic fluid to an actuator, e.g., linear hydraulic actuator 222, used to control a position of the coring head assembly 201 (e.g., to move the assembly between the elevated position and any one of the plurality of soil penetrating positions), and thus penetration depth of the tines 251 of the coring head assembly 201 (see also FIG. 3).

During operation, the output shaft (not shown) of the engine 104 (see FIG. 2) may provide power to the input 152 (see FIG. 6), which may in turn provide power to the transaxles 105 and to the pump 220. A link, e.g., tie rod 117, may couple each of the control levers 116 to a swashplate control arm 119 of its associated transaxle (i.e., control lever 116a is connected to transaxle 105a via tie rod 117a, and control lever 116b is connected to transaxle 105b via tie rod 117b). As a result (and as stated above), manipulation of each control lever 116 (e.g., movement from the neutral position to a forward or reverse position) proportionally controls speed (and rotational direction) of its respective drive wheel 106/coring head in a manner known in the art.

Figure 8:
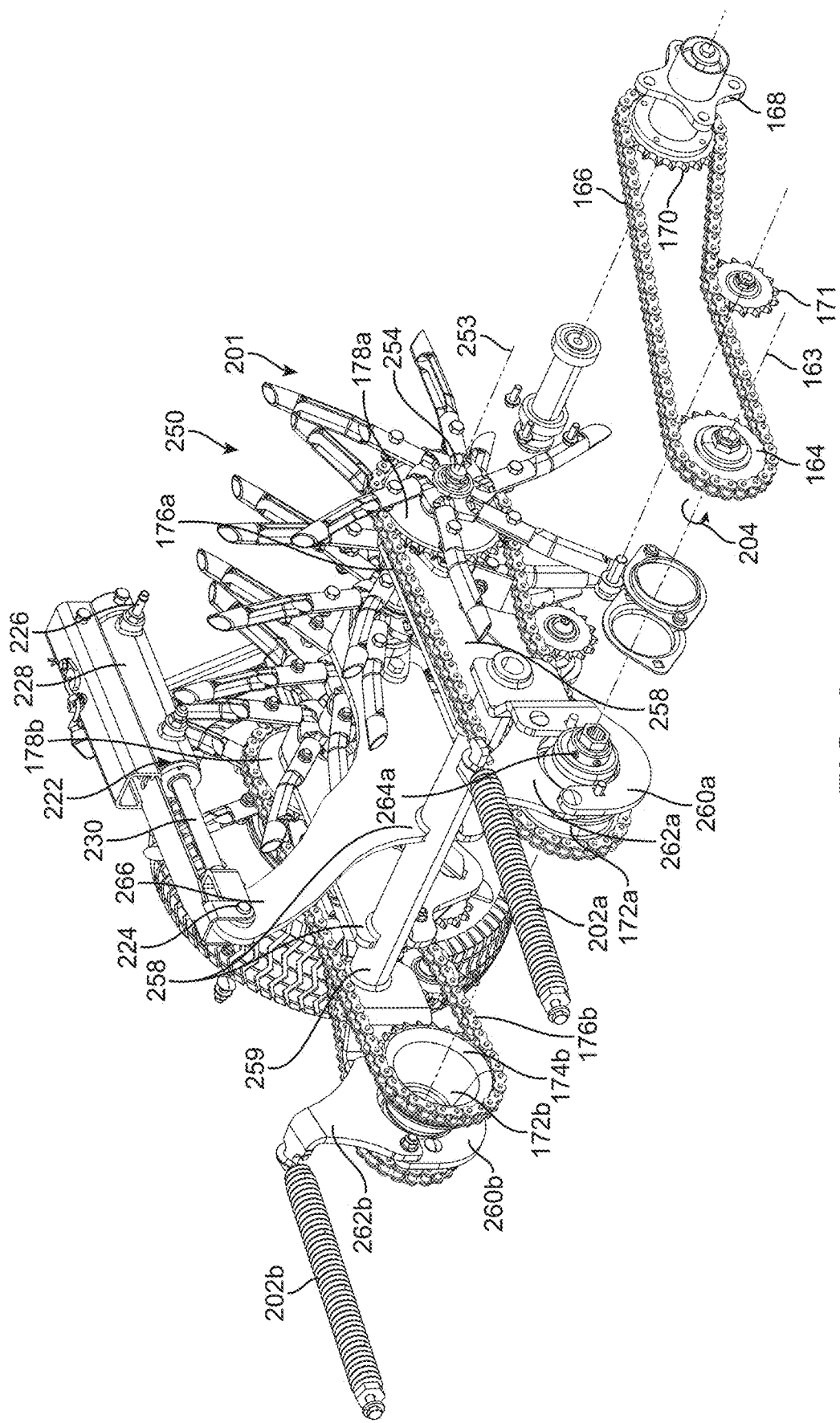
FIG. 8 is a partial exploded view of the propulsion and coring head drive system of FIG. 6.

FIG. 8 is a partial perspective view of a coring head assembly 201 (which includes, among other components, the coring head 250) and actuator assembly in accordance with embodiments of the present disclosure. As described elsewhere herein, the coring head 250 may include a plurality of coring disks 252 each having a plurality of (e.g., six) coring tines 251 (see also FIG. 4). The coring head 250 is adapted to rotate with the hex shaft 254 about the axis 253 such that the coring tines penetrate the soil surface as the aerator travels thereover. In the illustrated embodiment, each tine sprocket 178 (see FIG. 4) drives the hex shaft 254, which in turn, drives the associated two outermost disks 252 (i.e., the tine sprocket 178a drives the left two outermost tine disks 252L1 and 252L2 in FIG. 4, while the tine sprocket 178b drives the right two outermost tine disks 252R1 and 252R2). The innermost two tine disks 252 may again be undriven, i.e., they generally free-wheel about the hex shaft 254/axis 253.

The hex shaft 254 of the coring head 250 is supported, via the shaft supports 257 (see FIG. 4), by one or more (e.g., three) arms 258 (see also FIG. 3) that are, in turn, connected (e.g., welded) to a transverse beam 259 as shown in FIG. 8. The beam 259 is then connected (welded), e.g., at or near its outermost ends, to U-shaped brackets 260 (260a, 260b) which each have fastened thereto a spring arm 262 (262a, 262b). A bearing 264 (see bearing 264a in FIG. 8) may be attached to each bracket 262 and support the output shaft 162 of the associated transaxle 105 (not shown in FIG. 8, but see FIG. 6). The output shaft 162 also acts as the main pivot shaft/axis for the coring head assembly 201 as it pivots upwardly and downwardly relative to the soil surface 103.

A lever arm 266 may also be provided and attached to the transverse beam 259. In one embodiment, the lever arm may be formed by an upward extension of the center arm 258 as shown in FIG. 8. Near its upper end, the lever arm 266 connects to the actuator 222 at a rod pivot 224. A cylinder 228 of the actuator 222 may connect to the chassis via a trunnion pivot 226. Of course, the actuator 222 may be reversed, e.g., cylinder connected to the lever arm and rod connected to the chassis, without departing from the scope of this disclosure.

As shown in FIG. 9, the coring head assembly 201 may be moved from the elevated or transport position shown in solid lines, to a lower position (which may include any one of a plurality of aerating positions, one of which is partially represented by the broken line axis 253 and single tine 251) wherein the aerating tines 251 can penetrate the soil surface 103, by retracting the hydraulic actuator 222. In the illustrated embodiments, the coring head assembly 201 is moved from the elevated position to an aerating position by depressing a pedal 111 (see also FIG. 2) on the platform 112. As the actuator length shortens (i.e., as the rod retracts), the coring head assembly 201 may pivot downwardly, relative to the chassis 102, about a transverse pivot axis defined by the axis 163, such that the coring head axis 253 moves downwardly along an arc as shown. Penetration depth setting and control in accordance with embodiments of the present disclosure are described in more detail below.

The actuator 222 may be configured as a linear, single-acting hydraulic actuator (i.e., an actuator that is energized (e.g., pressurized) for retraction only to move the coring head assembly to a soil penetrating position). Once the coring head assembly 201 reaches a position corresponding to the tines reaching the desired soil penetration depth 249, the actuator may be de-energized and the coring head position held in place via hydraulic locking as further described below. To permit the coring head assembly 201 to move to the elevated position shown in solid lines in FIG. 9, the exemplary aerator 100 may utilize external biasing members or springs 202 (see 202a, 202b in FIG. 8) that apply a biasing force to the spring arms 262. Thus, when the actuator 222 is relieved (i.e., both sides of the actuator are ported to tank), the springs 202 cause the coring head assembly 201 to move toward the elevated position, e.g., by applying a biasing force in the direction 204 about the axis 163 (see FIG. 8). The springs 202 and the moment arm created by the spring arms 262 may be configured to provide a sufficient force to the coring head assembly 201 to return it to, and maintain it in, the elevated position shown in solid lines in FIG. 9. Alternatively or additionally, the actuator 222 could be configured as a double-acting cylinder that could energize (pressurize) for extension as well as retraction, optionally negating the need for the springs 202.

The return springs 202 provide, however, advantages over aerators that utilize a double-acting actuator to retract the coring head assembly 201. For example, the springs 202 may raise the coring head in the event of a hydraulic failure, and may ensure the coring head assembly is held in the transport position when the aerator is not running (i.e., hydraulic leakage does not result in the coring head assembly dropping). Still further, the springs may simplify hydraulic routing/valving as the extension side of the actuator 222 is not pressurized.

Figure 10:
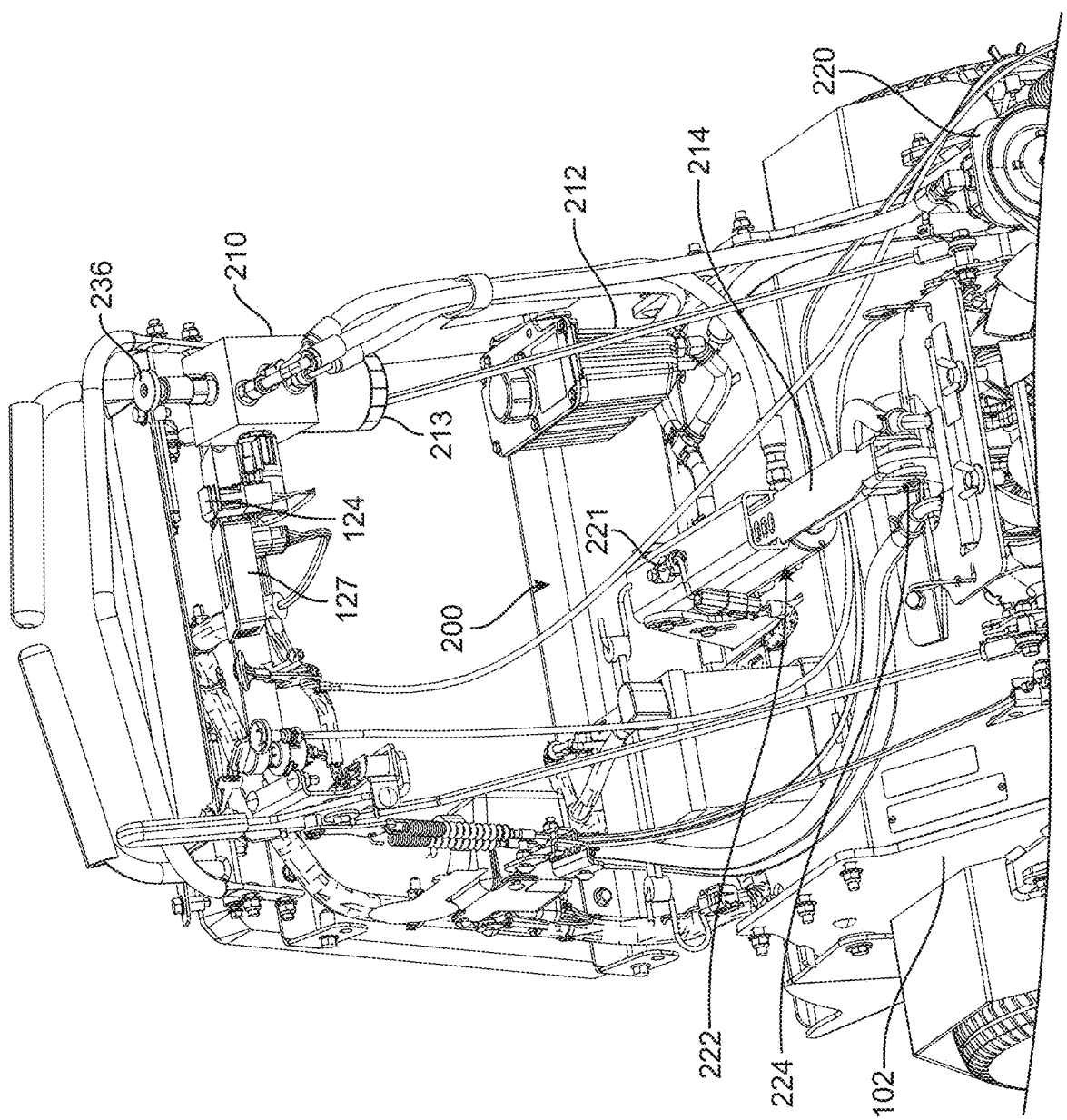
FIG. 10 is a partial perspective view of an exemplary actuator assembly including an actuator, rail support, sensor rail, and sensor for use with a coring head depth control system in accordance with embodiments of the present disclosure.

FIGS. 10-13 illustrate the exemplary actuator assembly and depth control system 200 in accordance with embodiments of the present disclosure. As shown in FIG. 10, the pump 220 may provide hydraulic pressure to a control manifold 210. The manifold 210, described in more detail below, includes a control port "Cl" connected to the retract side of the actuator 222 (see port "1" in FIG. 13), and a tank port "T" connected to a hydraulic reservoir 212.

Figure 11:
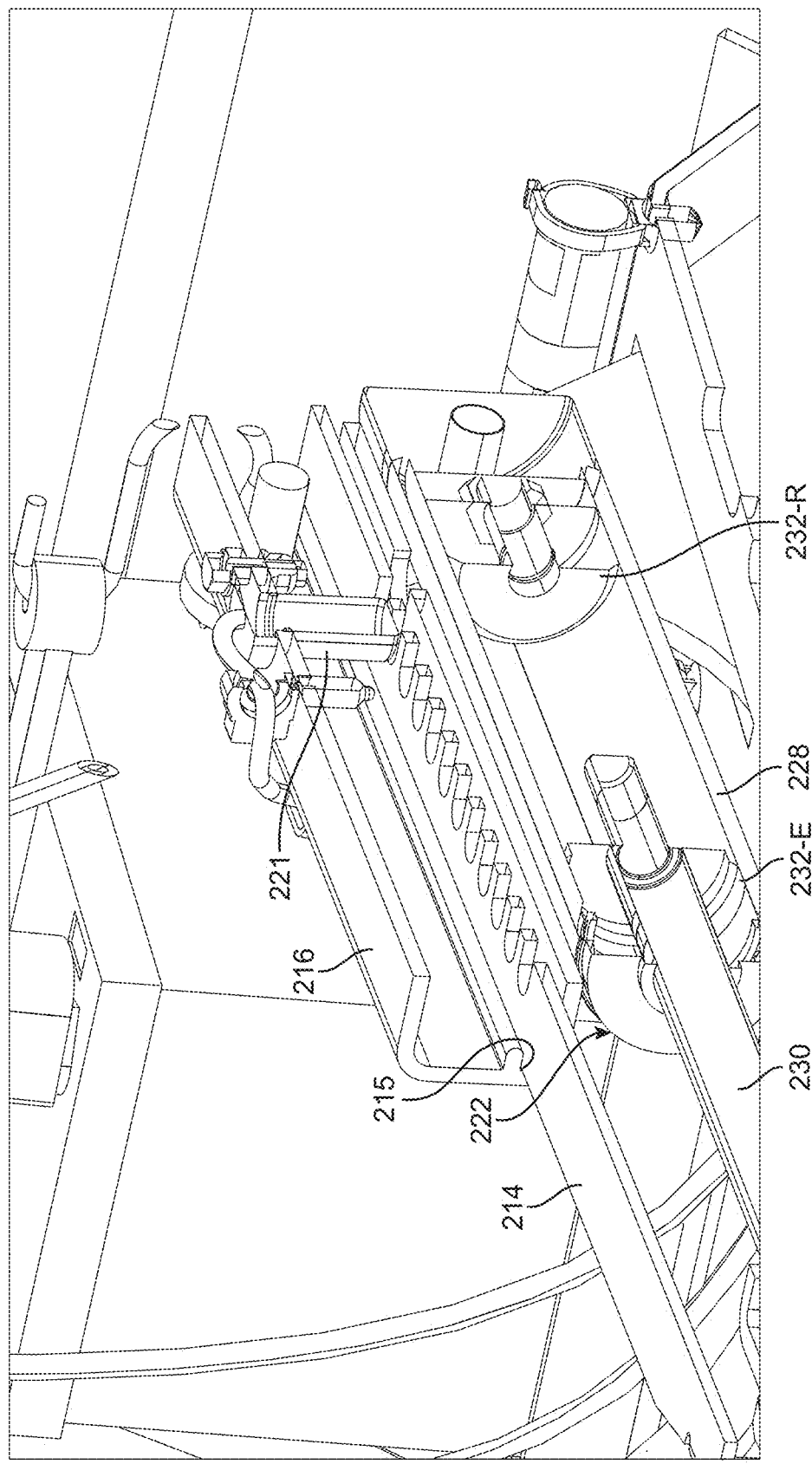
FIG. 11 is a partial section view of the actuator assembly of FIG. 10.

As shown in the section view of FIG. 11, the actuator 222 includes both the cylinder 228 and the rod 230. The rod is connected to a piston 232 that moves within the cylinder 228 under control of hydraulic pressure (e.g., the effective length of the actuator may change as the rod extends and retracts). The piston 232 may move between an extended position 232-E (corresponding to the coring head assembly 201 being in the elevated position) and a retracted position 232-R (corresponding to the coring head assembly being in the lowest aerating position).

Figure 12:
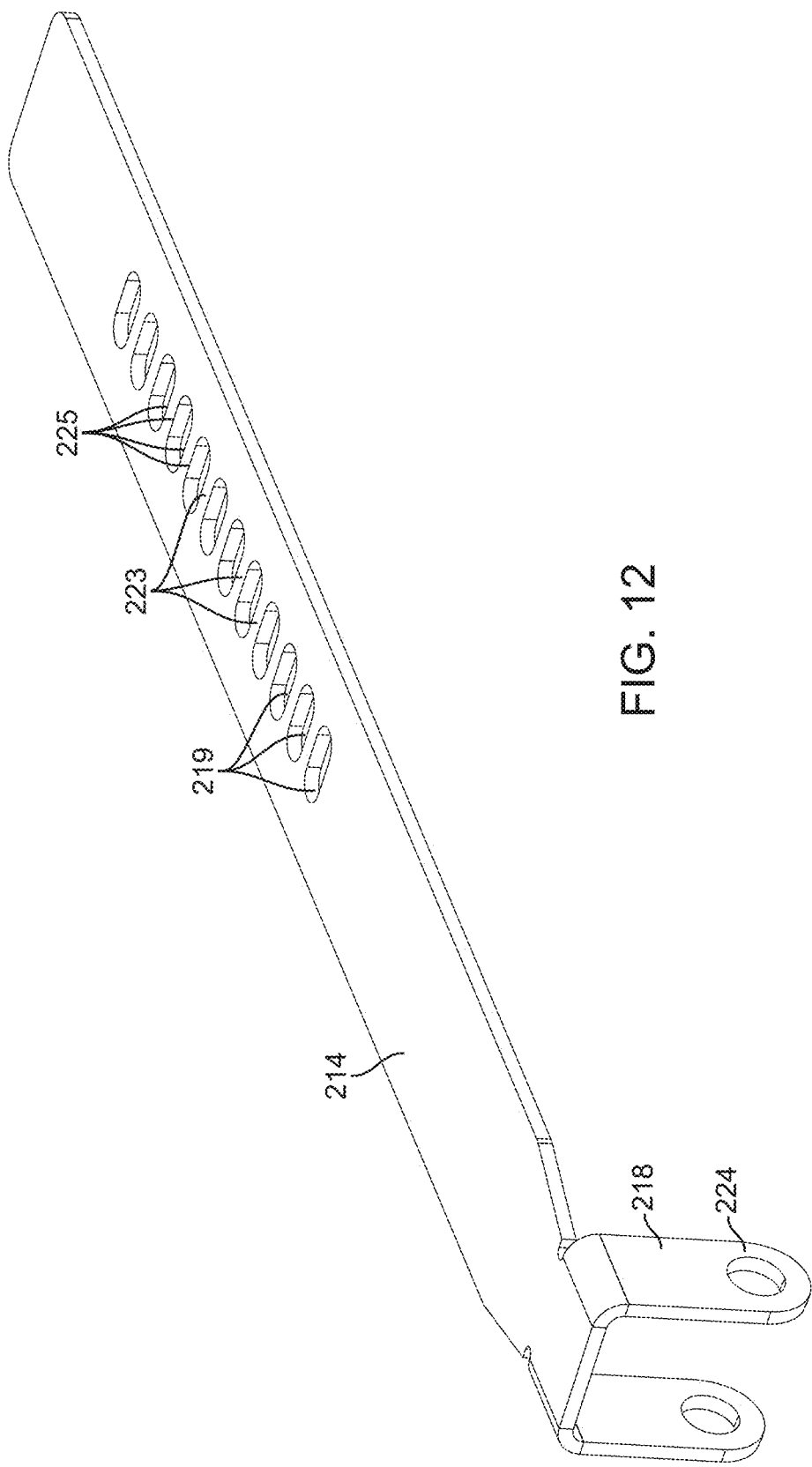
FIG. 12 is a perspective view of the exemplary sensor rail of FIGS. 10-11.

The coring head assembly 201 may additionally include a magnetic sensor rail 214 that slides along grooves 215 formed in a rail support 216. The rail support 216 may be attached to structure (e.g., to the chassis 102) as shown, or could alternatively couple directly to the cylinder 228. The sensor rail 214 includes a tab 218 as shown in FIG. 12 that permits connecting a distal end of the rail to a distal end of the rod 230 at the rod pivot 224 as shown in FIG. 10. As a result, the sensor rail 214 may move/translate with the actuator rod 230 as the rod extends and retracts from the cylinder 228. The rail support 216 may, in some embodiments, be configured as a tubular member defining the grooves 215. The rail support 216 may further be made of a plastic or other suitable bearing material that supports the sensor rail 214 with little or no binding as the sensor rail translates therein.

As further shown in FIG. 12, the sensor rail 214 may include a series of edges 225 that, in some embodiments, are defined by rungs 223 existing between perforations 219 formed in the sensor rail. While the edges 225 are, in the illustrated embodiments, formed by perforations extending entirely through the sensor rail 214, such a construction is exemplary only. Other embodiments could alternatively form edges 225 by providing a series of blind recesses or depressions in a face of the sensor rail 214, or even by providing protrusions that extend away from the face of the sensor rail. In fact, the edges 225 may be formed in most any manner and be of most any construction (e.g., any depth and shape) as long as they are detectable by a sensor as described below. For instance, suitable edges 225 could be provided by a gear rack, wherein the edges are formed by the gear teeth.

The edges 225 formed by the perforations/rungs may, in the illustrated embodiments, be used to determine the position of the rod 230 relative to the cylinder 228. For example, as shown in FIG. 11, a sensor, e.g., incremental quadrature encoder 221, may be attached to the rail support 216 such that it may register the edges 225 of the rungs 223 as the rod 230/rail 214 moves. The exemplary encoder may use two channels (e.g., A and B) with two code tracks having sectors positioned 90 degrees out of phase with one another. By sensing whether one output channel (e.g., A) leads the other (e.g., B), the encoder (along with the controller) may determine whether the actuator rod is extending or retracting. Moreover, by monitoring both the direction and number of pulses triggered by passage of the edges 225, the position of the rod 230 relative to the cylinder 228 (i.e., the effective length of the actuator) may be estimated at any time by the controller and sensor. In some embodiments, the encoder 221 may, to maintain accuracy, initialize/calibrate itself each time the coring head assembly 201 returns to its elevated position. In one exemplary embodiment, the sensor 221 is a series 37ADQ-LP quadrature speed sensor available from Sensor Solutions Corp. of Steamboat Springs, Colo., USA.

In the illustrated embodiments, the perforations 219/rungs 223 are linearly-spaced and a signal from the sensor is used to estimate (within the controller 127 as described below) the coring head assembly 201 depth relative to the rod position.

While described herein with application to moving the coring head assembly 201 of an aerator, actuator assemblies like those described and illustrated herein may be suitable for other linear actuator applications wherein estimating rod position relative to the cylinder is desired. Accordingly, embodiments of the present disclosure also include an actuator assembly including: a linear actuator having: a cylinder (e.g., cylinder 228); and a rod (e.g., rod 230) adapted to extend and retract from the cylinder. Such actuator assemblies may further include a rail support (rail support 216) positioned proximate the cylinder, and a sensor rail (sensor rail 214 supported by the rail support) attached to the rod. As described above, the sensor rail may translate relative to the rail support as the sensor rail moves with the rod. Moreover, as further described above, the sensor rail may define a series of edges (e.g., edges 225). A quadrature encoder (e.g., encoder 221) may also be attached to the rail support such that the encoder detects the passage of the edges as the rod extends and retracts from the cylinder.

While shown and described herein as detecting actuator 222 direction and position via an encoder 221, such a configuration is exemplary only as other position sensing concepts are also contemplated. For instance, a linear variable differential transformer (LVDT), magnetic, ultrasonic, or other electrical or optical sensor may be used to determine actuator position without departing from the scope of this enclosure. Accordingly, as used herein, "sensor" may refer to any device, switch, module, or system that can detect and measure movement of the actuator or some other positional feature of the coring head assembly 201 and generate a feedback signal representative thereof.

Figure 13:
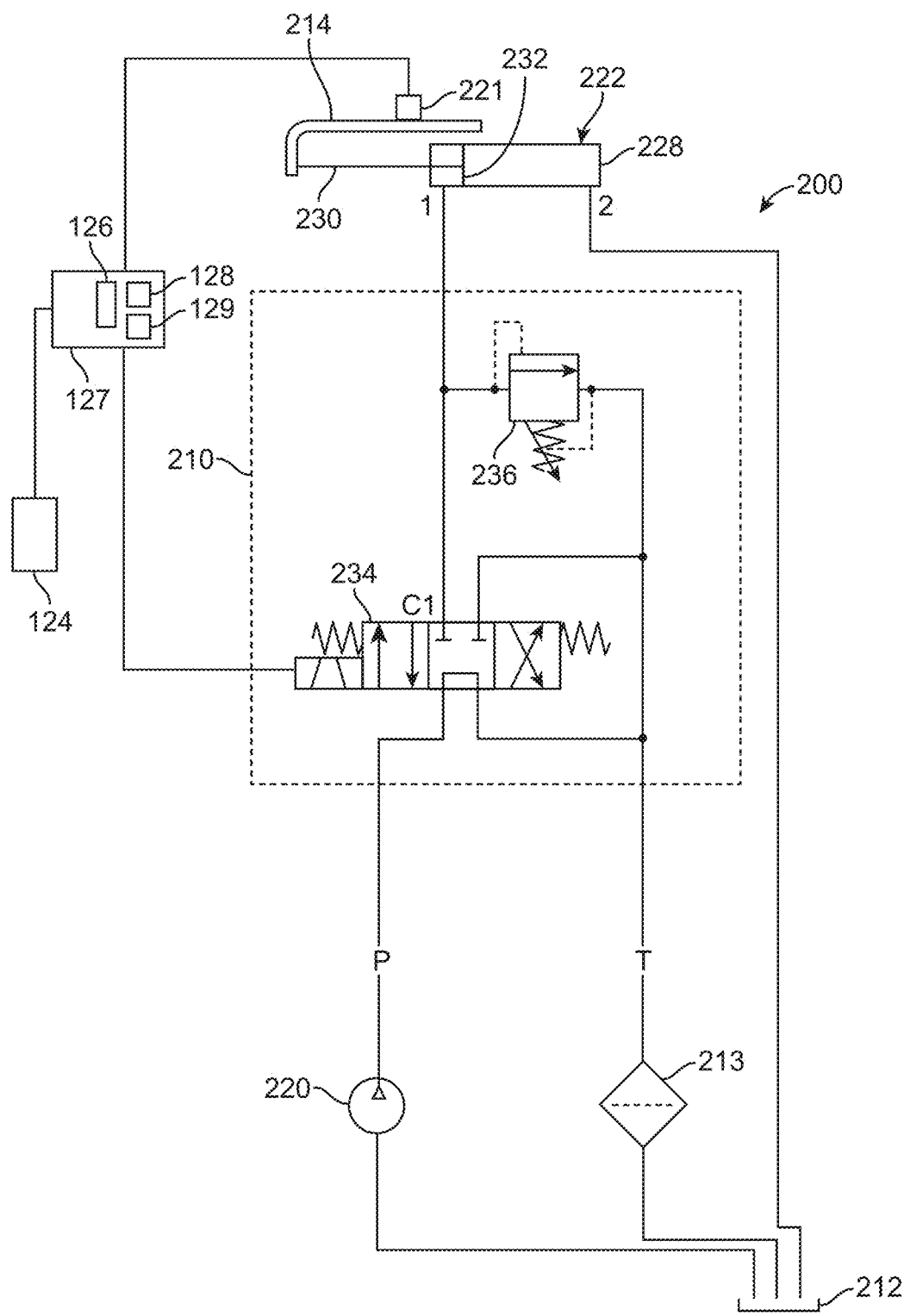
FIG. 13 is a hydraulic schematic for a coring head depth control system in accordance with embodiments of the present disclosure.

FIG. 13 illustrates an exemplary schematic and hydraulic circuit of the depth control system 200 in accordance with embodiments of the present disclosure. The depth control system 200 may maintain the desired soil penetration depth of the coring head assembly 201/tines 251 (as selected by the aerator operator) as the coring head assembly moves over turf areas of different soil hardness. As shown in FIG. 13, the pump 220 may draw hydraulic fluid from the reservoir 212 and provide pressurized fluid to the control manifold 210 (see also FIG. 10). The control manifold 210 may include both a directional valve 234 and a relief, e.g., pressure relief valve 236. Depending on the position of the directional valve 234, the manifold 210/valve may: (1) provide pressurized fluid to the actuator 222 to retract the actuator (e.g., to move the coring head assembly from its elevated position to a soil penetration depth); (2) bypass the actuator when the coring head assembly is at the desired soil penetration depth, effectively hydraulically locking the actuator in place; and (3) port hydraulic fluid from the retraction side of the piston 232 back to the reservoir 212. Return hydraulic flow to the reservoir 212 may be passed through a filter 213 as indicted in FIG. 13.

The directional valve 234 may operate under the control of an electronic control unit, e.g., the controller 127. While the controller 127 may monitor and control a variety of aerator functions, it is in some embodiments designed to at least automate the depth control system of the coring head assembly 201 as further described below.

The exemplary controller 127 may include a processor 128 that receives various inputs and executes one or more computer programs or applications stored in memory 129. The memory 129 may include computer-readable instructions or applications that, when executed, e.g., by the processor 128, cause the controller 127 to perform various calculations and/or issue commands. That is to say, the processor 128 and memory 129 may together define a computing apparatus operable to process input data and generate the desired output to one or more components/devices. For example, the processor 128 may receive various data including positional feedback data from the encoder 221, and generate actuator displacement commands to the directional valve 234 to cause the actuator to retract and move the coring head assembly to a penetration depth set by the depth control 124. In other words, the controller 127 may position and maintain the coring head assembly 201 at the desired penetration depth provided by the operator via the depth control 124.

In view of the above, it will be readily apparent that the functionality of the controller 127 may be implemented in any manner known to one skilled in the art. For instance, the memory 129 may include any volatile, non-volatile, magnetic, optical, and/or electrical media, such as a random-access memory (RAM), read-only memory (ROM), non-volatile RAM (NVRAIVI), electrically-erasable programmable ROM (EEPROM), flash memory, and/or any other digital media. While shown as both being incorporated into the controller 127, the memory 129 and the processor 128 could be contained in separate modules.

The processor 128 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 128 may include multiple components, such as any combination of one or more microprocessors, one or more controllers, one or more DSPs, one or more ASICs, and/or one or more FPGAs, as well as other discrete or integrated logic circuitry. The functions attributed to the controller 127/processor 128 herein may be embodied as software, firmware, hardware, or any combination thereof.

While the exemplary controller 127 is described above, those of skill in the art will appreciate that most any controller configuration that can receive a depth command (e.g., via an input from the depth control 124) and command displacement of the actuator 222 to provide the corresponding desired penetration depth, based optionally upon a feedback signal, is possible without departing from the scope of this disclosure. For example, it is contemplated that an analog system (e.g., using mechanical switches, potentiometers, etc.) could be substituted for the controller 127 without departing from the scope of this disclosure.

The manifold 210 may further include the adjustable pressure relief valve 236 as shown in FIGS. 10 and 13. The relief valve may be set by the operator to control the maximum pressure that may be applied to retract the rod 230 of the actuator 222. As further described below, such a feature may allow the coring head assembly 201 to momentarily raise rather than inadvertently cause the rear drive wheels 106 to lift off the soil surface 103 when hard soil is encountered.

During operation, the operator may set the penetration depth of the coring head assembly 201 to the desired penetration depth (e.g., 3 inches) via the control 124. In the illustrated embodiments, the control 124 (see also FIG. 5) may be a momentary rocker switch that permits penetration depth to be set from approximately 0.5 inches to 5 inches in approximately 0.5 inch increments. The depth set by the control 124 may be indicated on the display 126. Of course, other depth ranges and increments are certainly possible. Moreover, in some embodiments, explicit indication of depth may be indicated (e.g., in inches), while in other embodiments, depth may be indicated by relative terms (e.g., depth A, B, C, etc.).

Once the desired penetration depth is set, the aerator 100 may, if not so situated, be moved to an area having a relatively hard surface (e.g., concrete). At this time, the coring head assembly 201 may be lowered to the desired penetration depth (e.g., via pressing of the pedal 111 (see FIG. 2)). The operator may then manually adjust the relief valve 236, while standing on the platform 112, until the rear wheels 106 rise off of the hard surface. At this point, the relief valve 236 may be adjusted downwardly until the rear wheels 106 again rest upon the hard surface. At this point, the relieve valve is set and requires no additional adjustment unless the weight of the operator changes (e.g., change of operator).

While shown as using an adjustable relief valve, such a construction is exemplary only. That is, the relief valve could alternatively be pre-set to a fixed relief pressure during manufacture to accommodate a typical operator, wherein it is not configured to permit further adjustment by the end user.

With the coring head assembly 201 in its elevated position (e.g., when the operator is not depressing the pedal 111), the aerator 100 may be transported to the desired aerating area. The coring head assembly 201 may then be moved to the desired penetration depth by pressing the pedal 111. Upon receiving a signal that the pedal 111 has been depressed, the controller 127 may displace the spool of the directional valve 234 (e.g., to the right in FIG. 13), porting pressurized hydraulic fluid to port 1 of the actuator 222 and permitting any fluid on the other side of the piston to return to the reservoir 212 via port 2. The controller 127 may monitor the signal from the encoder 221 to determine when the actuator rod 230 reaches a position corresponding to the coring head assembly 201 being at the commanded desired penetration depth (e.g., setting "3"). Once the actuator 222 reaches the desired position, the controller 127 may de-energize the spool of the directional valve 234, wherein it returns to the position shown in FIG. 13 in which port 1 of the actuator 222 is dead-headed to hydraulically lock the actuator in its current position via an entrapped column of hydraulic fluid extending between the directional valve 234 and the piston 232 of the actuator.

As the actuator 222 is hydraulically locked in position, the desired penetration depth does not increase as the aerator 100 travels over turf areas having softer soil, nor does it decrease (with the exception noted below) as the aerator travels over turf areas having harder soil. As a result, generally consistent tine penetration depth may be achieved across properties with varying soil hardness. As used herein, "soil hardness" refers to the effective hardness of the soil itself, i.e., the resistance of the soil to tine penetration. For example, soil may be harder in a first area compared to a second area if the first area has more compacted soil, or if that soil contains more rocks, clay, tree roots, pipes, sprinkler components (heads/valves), hardscape elements, etc.

While consistent tine penetration depth is achieved over a wide variation in soil hardness, the relief (e.g., relief valve 236) may allow the coring head assembly 201 to temporarily float upwardly when soil hardness reaches or exceeds a predetermined hardness threshold. For example, should rocky soil or tree roots be encountered, the tines may be unable to penetrate the soil to the pre-set depth. In this instance, the pressure within the cylinder at port 1 will eventually reach the relief pressure set by the operator at the beginning of operation. Thus, instead of causing the rear wheels 106 to lift off the soil surface 103 as a result of the hard soil, the rising pressure in the actuator 222 will eventually force the relief valve 236 to open, causing the fluid on the retract side (port 1) of the piston 232 to port back to tank. As this occurs, the actuator 222 may extend, resulting in corresponding upward movement of the coring head assembly 201 (i.e., a reduction in soil penetration depth) to a temporary soil penetration depth less than the intended or desired soil penetration depth.

As the coring head assembly 201 rises, the signal from the encoder 221 to the controller 127 will indicate that the actuator 222 is no longer at the selected position that will provide the desired penetration depth. In this instance, the controller 127 will again energize the directional valve 234 in an effort to correct the actuator position. If soil conditions remain sufficiently hard to prevent the actuator 222 from reaching its desired position, the controller may, after a few seconds, de-energize the directional valve for a period of time before again trying to correct actuator position. The controller 127 may continue with this process of attempting to correct actuator position periodically until soil conditions allow achieving the desired soil penetration depth without exceeding the relief valve pressure setting (that is, the controller/actuator may return the coring head assembly to the desired soil penetration depth once encountering soil with a hardness at or below the predetermined hardness threshold).

In some embodiments, the controller 127 may attempt this corrective action (to return the coring head assembly 201 to the desired soil penetration depth) intermittently, e.g., at a fixed or variable duty cycle. For example, it may attempt to intermittently correct actuator position for 1 second of every 3-4 seconds until the actuator position is corrected. In this manner, excessive (i.e., constant) flow over the relief valve 236, and corresponding generation of heat, may be minimized.

At the completion of the aeration process, the operator may release the pedal 111. Upon sensing that the pedal is no longer depressed, the controller 127 may relieve pressure to port 1 of the actuator 222 to allow the coring head assembly 201 to move to its elevated position shown in solid lines in FIG. 9. That is, the controller 127 may energize the directional valve 234 to a third position (shift the spool to the left in FIG. 13) in which hydraulic fluid from port 1 of the actuator is ported back to the reservoir 212. As port 2 remains ported to reservoir, the coring head assembly 201 may return to its raised position under the biasing force of the springs 202 (see FIG. 8). Once the encoder signal indicates that the coring head assembly 201 is in the raised position, the controller 127 may again de-energize the directional valve 234, again hydraulically locking the rod 230 in place with the coring head assembly 201 in the elevated position.

While illustrative embodiments of the depth control system describe the use of a linear hydraulic cylinder, other actuators are contemplated. For instance, embodiments that replace the linear hydraulic actuator with a hydraulic rotary actuator, or an electrical or pneumatic actuator (rotary or linear) are possible without departing from the scope of this disclosure.

Systems and methods in accordance with embodiments of the present disclosure may thus provide various benefits over more conventional aerators using hydraulic pressure to control tine penetration depth. For instance, the aerator 100 may not require constant hydraulic pressure to maintain coring head assembly tine depth. As such constant hydraulic flow increases needed engine horsepower, as well as hydraulically-generated heat, avoiding constant flow may improve aerator efficiency and reduce heat-related hydraulic system degradation. Moreover, by not constantly actuating the cylinder, a larger portion of engine power may be directed to aerating and propulsion functions.

Advantageously, depth control systems in accordance with embodiments of the present disclosure may permit "on-the-fly" adjustment of tine penetration depth via manipulation of a simple operator control and without the need for adjustment of physical depth stops often found on conventional aerators. In addition to automatic tine penetration depth control, the electronic controller 127 may provide other benefits. For instance, the controller 127 may provide a supervisor mode, wherein the penetration depth may be set to a fixed value (or a sub-range of the depth range provided) to limit the operator's ability to set the penetration depth to a depth that is too shallow or too deep. Still further, while providing automatic depth control, systems and methods in accordance with embodiments of the present disclosure may also operate in a more conventional down pressure mode by, for example, setting the penetration depth to maximum and controlling depth via the relief valve 236. While such operation lacks the benefits of automatic depth control, it may be beneficial under some operating conditions.

While illustrated herein as an aerating apparatus, embodiments of the present disclosure are equally applicable to other soil penetrating apparatus and tools. Moreover, while described herein as providing a tool (coring head assembly) that is movable relative to a chassis of the vehicle supporting the tool, other embodiments may provide a tool that is generally fixed relative to the chassis. In this instance, the chassis itself may be configured to raise and lower, relative to a soil surface, to permit selective soil penetration of the tool.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A turf aerator comprising:
    a chassis;
    a coring head assembly operatively attached to the chassis and movable between an elevated position and any one of a plurality of aerating positions;
    a control input adapted to select a desired soil penetration depth from a plurality of soil penetration depths, wherein each of the plurality of soil penetration depths corresponds to a different position of the plurality of aerating positions of the coring head assembly;
    a linear hydraulic actuator adapted to move the coring head assembly between the elevated position and any one of the plurality of aerating positions;
    a controller adapted to command the actuator to a position corresponding to the desired soil penetration depth;
    a sensor adapted to provide a feedback signal to the controller corresponding to the position of the coring head assembly; and
    a valve adapted to:
        deliver hydraulic flow to the hydraulic actuator while the coring head assembly moves from the elevated position to the desired soil penetration depth; and
        bypass, with the hydraulic flow, the hydraulic actuator while the coring head assembly is at the desired soil penetration depth.

2. The aerator of claim 1, further comprising a relief valve adapted to permit movement of the coring head assembly to a temporary soil penetration depth less than the desired soil penetration depth upon the coring head assembly encountering soil having a hardness greater than a predetermined hardness threshold.

3. The aerator of claim 2, wherein the relief valve is adjustable.

4. The aerator of claim 2, wherein the controller is adapted to return the coring head assembly to the desired soil penetration depth upon encountering soil having a hardness equal to or less than the predetermined hardness threshold.

5. The aerator of claim 2, wherein the controller intermittently attempts to return the coring head assembly to the desired soil penetration depth in accordance with a predefined duty cycle.

6. The aerator of claim 1, wherein the coring head assembly includes a left side and a right side, the left side driven independently from the right side.

7. The aerator of claim 1, wherein the controller, in combination with the sensor, is operable to estimate an effective length of the linear hydraulic actuator.

8. The aerator of claim 1, wherein the sensor is a quadrature encoder.

9. The aerator of claim 1, wherein the coring head assembly is held at the desired soil penetration depth by an entrapped column of hydraulic fluid between the valve and the actuator.

10. The aerator of claim 1, further comprising biasing members adapted to return the coring head assembly to the elevated position.

11. A turf aerator comprising:
    a chassis supported upon a soil surface by left and right drive members;
    a coring head assembly operatively attached to the chassis and adapted to rotate about a coring head axis transverse to a longitudinal axis of the aerator, the coring head assembly movable between an elevated position and any one of a plurality of aerating positions;
    a prime mover attached to the chassis and adapted to power the coring head assembly and one or more of the drive members; and
    a depth control system adapted to maintain a desired soil penetration depth of the coring head assembly as the coring head assembly moves over turf areas of different soil hardness, the control system comprising:
        a control input adapted to set the desired soil penetration depth from a plurality of soil penetration depths, wherein each of the plurality of soil penetration depths corresponds to a different position of the plurality of aerating positions of the coring head assembly;
        a sensor operable to estimate a position of the coring head assembly;
        a relief adapted to permit a reduction of soil penetration depth to a depth less than the desired soil penetration depth when the coring head assembly encounters a soil hardness exceeding a predetermined hardness threshold;
        an actuator adapted to return the coring head assembly to the desired soil penetration depth when the soil hardness is again at or below the predetermined hardness threshold;
        a sensor rail attached to a rod of the actuator, the sensor rail comprising a series of edges formed therein, wherein the sensor comprises an encoder adapted to detect passage of the edges in the sensor rail; and
        a controller adapted to energize the actuator to move the coring head assembly to the desired soil penetration depth.

12. The aerator of claim 11, wherein the actuator comprises a linear hydraulic actuator.

13. The aerator of claim 12, wherein the controller, in combination with the sensor, is operable to estimate an effective length of the linear hydraulic actuator.

14. The aerator of claim 12, wherein the relief comprises a relief valve adapted to relieve pressure to the actuator when the coring head assembly encounters soil that exceeds the predetermined hardness threshold.

* * * * *